(12) United States Patent
Shen et al.

(10) Patent No.: US 11,558,117 B2
(45) Date of Patent: Jan. 17, 2023

(54) WIRELESS RADIO FREQUENCY CONVERSION SYSTEM

(71) Applicant: AuthenX Inc., Hsinchu County (TW)

(72) Inventors: Po-Kuan Shen, Hsinchu County (TW); Sheng-Fu Lin, Hsinchu County (TW); Yu-Chun Wang, Hsinchu County (TW); Kai-Lun Han, Hsinchu County (TW); Chun-Chiang Yen, Hsinchu County (TW); Jenq-Yang Chang, Hsinchu County (TW); Mao-Jen Wu, Hsinchu County (TW)

( * ) Notice: Subject to any disclaimer, the term of this patent is extended or adjusted under 35 U.S.C. 154(b) by 0 days.

(21) Appl. No.: 17/445,836

(22) Filed: Aug. 25, 2021

(65) Prior Publication Data
US 2022/0069910 A1  Mar. 3, 2022

Related U.S. Application Data

(60) Provisional application No. 63/070,282, filed on Aug. 26, 2020.

(51) Int. Cl.
| | |
|---|---|
| *H04B 10/2575* | (2013.01) |
| *G02B 6/293* | (2006.01) |
| *G02B 6/42* | (2006.01) |
| *H04J 14/02* | (2006.01) |

(52) U.S. Cl.
CPC ..... *H04B 10/25759* (2013.01); *G02B 6/2938* (2013.01); *G02B 6/4215* (2013.01); *H04J 14/02* (2013.01)

(58) Field of Classification Search
CPC .......... H04B 10/25759; H04B 10/2575; H04B 10/40; H04B 1/38; H04B 10/25753; H04B 10/43; H04B 10/1143; H04B 10/25752; H04B 10/1123; H04B 10/25758; H04B 10/114; H04B 5/02; H04B 2203/5441; H04B 10/11; H04B 10/506; H04B 7/02; H04B 7/04; H04B 7/0404; H04B 7/0413; H04B 7/0452; H04B 7/0456; H04B 7/0613; H04B 7/0686; H04B 7/0689;
(Continued)

(56) References Cited

U.S. PATENT DOCUMENTS

| | | |
|---|---|---|
| 7,787,823 B2 | 8/2010 | George et al. |
| 8,175,459 B2 | 5/2012 | Thelen et al. |
| 9,037,143 B2 | 5/2015 | Berlin et al. |

(Continued)

*Primary Examiner* — Hibret A Woldekidan

(57) ABSTRACT

A wireless radio frequency conversion system is disclosed. The wireless radio frequency conversion system includes a wireless radio frequency transmit-receive device, a first conversion device, at least one optical fiber, a second conversion device, and a wireless radio frequency transmission device. The wireless radio frequency transmit-receive device performs a conversion and a transmit-receive manner to at least one radio frequency signal and at least one data signal. The first conversion device performs a conversion to the at least one data signal and at least one optical signal. The optical fiber transmits the at least one optical signal. The second conversion device performs a conversion to the at least one optical signal and the at least one data signal. The wireless radio frequency transmission device performs a conversion and a transmit-receive manner to the at least one data signal and the at least one terminal signal.

37 Claims, 15 Drawing Sheets

(58) Field of Classification Search
CPC .. H04B 7/0691; G02B 6/2938; G02B 6/4215; H04J 14/02; H04J 14/0298; H04L 27/2601
USPC .................. 398/82, 135–139, 115–117, 141
See application file for complete search history.

(56) References Cited

U.S. PATENT DOCUMENTS

| | | |
|---|---|---|
| 9,564,972 B2 | 2/2017 | Benjamin et al. |
| 9,602,209 B2 | 3/2017 | George et al. |
| 9,729,267 B2 | 8/2017 | Rosenfelder |
| 2014/0304318 A1 | 10/2014 | Eklund |
| 2015/0147066 A1* | 5/2015 | Benjamin ........ H04B 10/25759 398/116 |
| 2017/0288828 A1 | 10/2017 | Liu et al. |
| 2019/0190609 A1* | 6/2019 | Fernando ............. H04B 10/802 |
| 2020/0112372 A1 | 4/2020 | Nishimoto et al. |

* cited by examiner

WIRELESS RADIO FREQUENCY CONVERSION SYSTEM

RELATED APPLICATIONS

This application claims priority to U.S. Provisional Application Ser. No. 63/070,282, filed Aug. 26, 2020, which is herein incorporated by reference in its entirety.

BACKGROUND

Field of Invention

The present disclosure relates to a wireless transmission system. More particularly, the present disclosure relates to a wireless radio frequency conversion system.

Description of Related Art

With advent of 5th generation mobile networks (5G) era, mobile devices can receive and transmit huge data through 5G network.

However, due to the characteristic of 5G network, the antenna cannot be disposed outdoor along like 4G network, and other related elements (e.g. Remote Radio Unit (RRU) and Baseband Unit (BBU)) cannot be disposed indoor like 4G network either. Therefore, there is a need to provide a new system disposition for 5G network so as to meet the need of 5G network. As such, there is an urgent need for industry to find out a solution.

SUMMARY

The foregoing presents a simplified summary of the disclosure in order to provide a basic understanding to the reader. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

The present disclosure provides a wireless radio frequency conversion system. The wireless radio frequency conversion system comprises a wireless radio frequency transmit-receive device, a first conversion device, at least one optical fiber, a second conversion device, and a wireless radio frequency transmission device. The wireless radio frequency transmit-receive device is configured to perform a conversion and a transmit-receive manner to at least one radio frequency signal and at least one data signal. The first conversion device is coupled to the wireless radio frequency transmit-receive device, and configured to perform a conversion to the at least one data signal and at least one optical signal. The at least one optical fiber is coupled to the first conversion device, and configured to transmit the at least one optical signal. The second conversion device is coupled to the at least one optical fiber, and configured to perform a conversion to the at least one optical signal and the at least one data signal. The wireless radio frequency transmission device is coupled to the second conversion device, and configured to perform a conversion and a transmit-receive manner to the at least one data signal and at least one terminal signal.

In one embodiment, the at least one data signal or the at least one terminal signal comprises one of at least one radio frequency signal, at least one IQ signal, at least one backhaul transmitting signal, and at least one intermediate frequency signal.

In one embodiment, a number of the second conversion device is plural, and a number of the wireless radio frequency transmission device is plural, wherein the second conversion devices are configured to perform a conversion to the at least one optical signal and the at least one data signal, and the wireless radio frequency transmission devices are configured to perform a conversion and transmit-receive manner to the at least one data signal and the at least one terminal signal.

In one embodiment, a number of the wireless radio frequency transmit-receive device is plural, and a number of the first conversion device is plural, wherein the wireless radio frequency transmit-receive devices are configured to perform a conversion to the at least one radio frequency signal and the at least one data signal, and the first conversion devices are configured to perform a conversion and a transmit-receive manner to the at least one data signal and the at least one optical signal.

In one embodiment, the wireless radio frequency transmit-receive device comprises at least one first antenna and a first remote radio equipment. The at least one first antenna is configured to transmit and receive the at least one radio frequency signal. The first remote radio equipment is configured to perform a conversion to the at least one radio frequency signal and the at least one data signal. The wireless radio frequency transmission device comprises a second remote radio equipment and at least one second antenna. The second remote radio equipment is configured to perform a conversion to the at least one data signal and the at least one terminal signal. The at least one second antenna is configured to transmit and receive the at least one terminal signal.

In one embodiment, the wireless radio frequency conversion system further comprises a radio frequency transceiver. The radio frequency transceiver is disposed in the first remote radio equipment or disposed in the second remote radio equipment.

In one embodiment, the wireless radio frequency transmit-receive device comprises at least one first antenna and a radio frequency front end processor. The at least one first antenna is configured to transmit and receive the at least one radio frequency signal. The radio frequency front end processor is configured to perform a front end signal processing to the at least one radio frequency signal and the at least one data signal. The wireless radio frequency transmission device comprises a radio frequency transceiver. The radio frequency transceiver is configured to perform an analog to digital conversion to the at least one data signal and the at least one terminal signal, and configured to transmit and receive the at least one terminal signal.

In one embodiment, the wireless radio frequency transmit-receive device comprises at least one first antenna and a remote radio equipment. The at least one first antenna is configured to transmit and receive the at least one radio frequency signal. The remote radio equipment is configured to perform a conversion to the at least one radio frequency signal and the at least one data signal. The wireless radio frequency transmission device comprises a processor. The processor is configured to perform a signal processing and a transmit-receive manner to the at least one data signal and the at least one terminal signal.

In one embodiment, the processor comprises one of a baseband unit, a centralized unit and a distribute unit.

In one embodiment, the wireless radio frequency conversion system further comprises a radio frequency transceiver. The radio frequency transceiver is disposed in the remote radio equipment or disposed in the processor.

In one embodiment, the wireless radio frequency transmit-receive device is configured to perform a conversion and a transmit-receive manner to the at least one radio frequency signal and the at least one data signal, wherein one of the first conversion device and the second conversion device comprises a plurality of drivers, a plurality of photoelectric converters, a first multiplexer, and an optical isolator. The plurality of drivers is configured to receive the at least one data signal. The drivers drive the photoelectric converters to generate the at least one optical signal according to the at least one data signal. The first multiplexer is configured to receive the at least one optical signal, and combine the at least one optical signal to generate a combination optical signal. The optical isolator is configured to let the combination optical signal generated by the first multiplexer pass. One of the first conversion device and the second conversion device further comprises a second multiplexer, a plurality of photodetectors, and a plurality of amplifiers. The second multiplexer is configured to receive the combination optical signal, and distribute the combination optical signal into the at least one optical signal. The plurality of photodetectors are configured to detect the at least one optical signal, and generate the at least one data signal according to the at least one optical signal. The plurality of amplifiers are configured to receive the at least one data signal, and configured to amplify the at least one data signal.

In one embodiment, one of the first conversion device and the second conversion device further comprises an optical splitter/combiner. The optical splitter/combiner is coupled to the optical isolator and the second multiplexer, and configured to transmit the combination optical signal generated by the optical isolator to the at least one optical fiber, wherein the optical splitter/combiner is further configured to receive the combination optical signal, and transmit the combination optical signal to the second multiplexer and the optical isolator, wherein the combination optical signal is blocked by the optical isolator.

In one embodiment, the wireless radio frequency transmit-receive device is configured to perform a conversion and a transmit-receive manner to the at least one radio frequency signal and the at least one data signal, wherein one of the first conversion device and the second conversion device comprises a first driver, a first photoelectric converter, a first optical isolator, a first photodetector, a first amplifier, and a first optical splitter/combiner. The first driver is configured to receive a first data signal of the at least one data signal. The first driver drives the first photoelectric converter to generate a first optical signal according to the first data signal. The first optical isolator is configured to let the first optical signal pass. The first photodetector is configured to detect the first optical signal, and generate the first data signal according to the first optical signal. The first amplifier is configured to receive the first data signal, and amplify the first data signal. The first optical splitter/combiner is coupled to the first optical isolator and the first photodetector, and configured to transmit the first optical signal transmitted by the first optical isolator to the at least one optical fiber, wherein the first optical splitter/combiner is further configured to receive the first optical signal transmitted by the at least one optical fiber, and transmit the first optical signal to the first optical isolator and the first photodetector, wherein the first optical signal is blocked by the first optical isolator. One of the first conversion device and the second conversion device further comprises a second driver, a second photoelectric converter, a second optical isolator, a second photodetector, a second amplifier, and a second optical splitter/combiner. The second driver is configured to receive a second data signal of the at least one data signal. The second driver drives the second photoelectric converter to generate a second optical signal according to the second data signal. The second optical isolator is configured to let the second optical signal pass. The second photodetector is configured to detect the second optical signal, and generate the second data signal according to the second optical signal. The second amplifier is configured to receive the second data signal, and amplify the second data signal. The second optical splitter/combiner is coupled to the second optical isolator and the second photodetector, and configured to transmit the second optical signal transmitted by the second optical isolator to the at least one optical fiber, wherein the second optical splitter/combiner is further configured to receive the second optical signal transmitted by the at least one optical fiber, and transmit the second optical signal to the second optical isolator and the second photodetector, wherein the second optical signal is blocked by the second optical isolator.

In one embodiment, one of the first conversion device and the second conversion device further comprises a multiplexer. The multiplexer is coupled to the first optical splitter/combiner and the second optical splitter/combiner, configured to combine the first optical signal and the second optical signal to generate a combination optical signal, and configured to transmit the combination optical signal to the at least one optical fiber, or the multiplexer is configured to receive the combination optical signal transmitted by the at least one optical fiber, and configured to distribute the combination optical signal into the first optical signal and the second optical signal.

In one embodiment, a number of the at least one optical fiber is plural, and the optical fibers are further configured to transmit a plurality of optical signals, wherein the first optical splitter/combiner is configured to transmit the first optical signal to the optical fibers, and the second optical splitter/combiner is configured to transmit the second optical signal to the optical fibers, and the optical fibers transmit the first optical signal and the second optical signal.

In one embodiment, the wireless radio frequency transmit-receive device is configured to perform a conversion and a transmit-receive manner to the at least one radio frequency signal and the at least one data signal, wherein the first conversion device comprises a plurality of first drivers, a plurality of first photoelectric converters, and a first multiplexer. The plurality of first drivers are configured to receive the at least one data signal. The first drivers drive the first photoelectric converters to generate the at least one optical signal according to the at least one data signal. The first multiplexer is configured to receive the at least one optical signal, and combine the at least one optical signal to generate a first combination optical signal. The second conversion device comprises a second multiplexer, a plurality of first photodetectors, and a plurality of first amplifiers. The second multiplexer is configured to receive the first combination optical signal, and distribute the first combination optical signal into the at least one optical signal. The plurality of first photodetectors are configured to detect the at least one optical signal, and generate the at least one data signal according to the at least one optical signal. The plurality of first amplifiers are configured to receive the at least one data signal, and amplify the at least one data signal.

In one embodiment, the second conversion device further comprises a plurality of second drivers, a plurality of second photoelectric converters, and a third multiplexer. The plurality of second drivers are configured to receive the at least one data signal. The second drivers drive the second photoelectric converters to generate the at least one optical signal according to the at least one data signal. The third multiplexer is configured to receive the at least one optical signal, and combine the at least one optical signal to generate a second combination optical signal. The first conversion device further comprises a fourth multiplexer, a plurality of second photodetectors, and a plurality of second amplifiers. The fourth multiplexer is configured to receive the second combination optical signal, and distribute the second combination optical signal into the at least one optical signal. The plurality of second photodetectors are configured to detect the at least one optical signal, and generate the at least one data signal according to the at least one optical signal. The plurality of second amplifiers are configured to receive the at least one data signal, and amplify the at least one data signal.

In one embodiment, the wireless radio frequency transmit-receive device configured to perform a conversion and a transmit-receive manner to the at least one radio frequency signal and the at least one data signal, wherein one of the first conversion device and the second conversion device comprises a plurality of drivers, a plurality of photoelectric converters, a first multiplexer, a second multiplexer, a plurality of photodetectors, and a plurality of amplifiers. The plurality of drivers are configured to receive the at least one data signal. The drivers drive the photoelectric converters to generate the at least one optical signal according to the at least one data signal. The first multiplexer is configured to receive the at least one optical signal, and combine the at least one optical signal to generate a combination optical signal. The second multiplexer is configured to receive the combination optical signal, and distribute the combination optical signal into the at least one optical signal. The plurality of photodetectors are configured to detect the at least one optical signal, and generate the at least one data signal according to the at least one optical signal. The plurality of amplifiers are configured to receive the at least one data signal, and amplify the at least one data signal.

In one embodiment, one of the first conversion device and the second conversion device further comprises a half-band filter. The half-band filter is configured to receive and transmit the combination optical signal generated by the first multiplexer to the at least one optical fiber, and configured to receive and transmit the combination optical signal received by the at least one optical fiber to the second multiplexer.

In one embodiment, the wireless radio frequency transmit-receive device is configured to perform a conversion and a transmit-receive manner to the at least one radio frequency signal and the at least one data signal, wherein the first conversion device comprises a plurality of first drivers, a plurality of first photoelectric converters, a plurality of first photodetectors, a plurality of first amplifiers, and a first multiplexer. The plurality of first drivers are configured to receive the at least one data signal. The first drivers drive the first photoelectric converters to generate the at least one optical signal according to the at least one data signal. The plurality of first photodetectors are configured to detect the at least one optical signal, and generate the at least one data signal according to the at least one optical signal. The plurality of first amplifiers are configured to receive the at least one data signal, and amplify the at least one data signal.

The first multiplexer is coupled to the first photoelectric converters and the first photodetectors, wherein the first multiplexer is configured to combine the at least one optical signal to generate a combination optical signal, or distribute the combination optical signal into the at least one optical signal. The second conversion device comprises a plurality of second drivers, a plurality of second photoelectric converters, a plurality of second photodetectors, a plurality of second amplifiers, and a second multiplexer. The plurality of second drivers are configured to receive the at least one data signal. The second drivers drive the second photoelectric converters to generate the at least one optical signal according to the at least one data signal. The plurality of second photodetectors are configured to detect the at least one optical signal, and generate the at least one data signal according to the at least one optical signal. The plurality of second amplifiers are configured to receive the at least one data signal, and amplify the at least one data signal. The second multiplexer is coupled to the second photoelectric converters and the second photodetectors, wherein the second multiplexer is configured to combine the at least one optical signal to generate the combination optical signal, or distribute the combination optical signal into the at least one optical signal.

The present disclosure provides a wireless radio frequency conversion system. The wireless radio frequency conversion system comprises a wireless radio frequency transmit-receive device, a first conversion device, an optical fiber, a second conversion device, and a wireless radio frequency transmission device. The first conversion device comprises a transmit-receive terminal multiplexer. The second conversion device comprises a transmitting terminal multiplexer. The wireless radio frequency transmit-receive device is configured to perform a conversion and a transmit-receive manner to a plurality of radio frequency signals and a plurality of data signals. The first conversion device is coupled to the wireless radio frequency transmit-receive device, and configured to perform a conversion to the data signals and a plurality of optical signals. The transmit-receive terminal multiplexer is configured to combine the optical signals to generate a combination optical signal, or distribute the combination optical signal into the optical signals. The optical fiber is coupled to the transmit-receive terminal multiplexer, and configured to transmit the combination optical signal. The second conversion device is configured to perform a conversion to the optical signals and the data signals. The transmitting terminal multiplexer is coupled to the optical fiber, and configured to transmit and receive the combination optical signal, wherein the transmitting terminal multiplexer distributes the combination optical signal into the optical signals, or combine the optical signals to generate the combination optical signal. The wireless radio frequency transmission device is coupled to the second conversion device, and configured to perform a conversion and a transmit-receive manner to the data signals and a plurality of terminal signals.

In one embodiment, the data signals or the terminal signals comprise one of at least one radio frequency signal, at least one IQ signal, at least one backhaul transmitting signal, and at least one intermediate frequency signal.

In one embodiment, a number of the second conversion device is plural, and a number of the wireless radio frequency transmission device is plural, wherein the second conversion devices are configured to perform a conversion to the optical signals and the data signals, and the wireless radio frequency transmission devices are configured to perform a conversion and a transmit-receive manner to the data signals and the terminal signals.

In one embodiment, a number of the wireless radio frequency transmit-receive device is plural, and a number of the first conversion device is plural, wherein the wireless radio frequency transmit-receive devices are configured to perform a conversion to the radio frequency signals and the data signals, and the first conversion devices are configured to perform a conversion and a transmit-receive manner to the data signals and the optical signals.

In one embodiment, the wireless radio frequency transmit-receive device comprises a plurality of first antennas and a first remote radio equipment. The plurality of first antennas are configured to transmit and receive the radio frequency signals. The first remote radio equipment is configured to perform a conversion to the radio frequency signals and the data signals. The wireless radio frequency transmission device comprises a second remote radio equipment and a plurality of second antennas. The second remote radio equipment is configured to perform a conversion to the data signals and the terminal signals. The plurality of second antennas are configured to transmit and receive the terminal signals.

In one embodiment, the wireless radio frequency conversion system further comprises a radio frequency transceiver. The radio frequency transceiver is disposed in the first remote radio equipment or disposed in the second remote radio equipment.

In one embodiment, the wireless radio frequency transmit-receive device comprises a plurality of first antennas and a radio frequency front end processor. The plurality of first antennas are configured to transmit and receive the radio frequency signals. The radio frequency front end processor is configured to perform a front end signal processing to the radio frequency signals and the data signals. The radio frequency transceiver is configured to perform an analog to digital conversion to the data signals and the terminal signals, and configured to transmit and receive the terminal signals.

In one embodiment, the wireless radio frequency transmit-receive device comprises a plurality of first antennas and a remote radio equipment. The plurality of first antennas are configured to transmit and receive the radio frequency signals. The remote radio equipment is configured to perform a conversion to the radio frequency signals and the data signals. The wireless radio frequency transmission device comprises a processor. The processor is configured to perform a signal processing and a transmit-receive manner to the data signals and the terminal signals.

In one embodiment, the processor comprises at least one of a baseband unit, a centralized unit, and a distribute unit.

In one embodiment, the wireless radio frequency conversion system further comprises a radio frequency transceiver. The radio frequency transceiver is disposed in the remote radio equipment or disposed in the processor.

In one embodiment, one of the first conversion device and the second conversion device comprises a plurality of drivers, a plurality of photoelectric converters, and an optical isolator. The plurality of drivers are configured to receive the data signals. The drivers drive the photoelectric converters to generate the optical signals according to the data signals. One of the transmit-receive terminal multiplexer of the first conversion device and the transmitting terminal multiplexer of the second conversion device comprises a first multiplexer. The first multiplexer is configured to receive the optical signals, and combine the optical signals to generate the combination optical signal, wherein the optical isolator is configured to let the combination optical signal generated by the first multiplexer pass. One of the transmit-receive terminal multiplexer of the first conversion device and the transmitting terminal multiplexer of the second conversion device further comprises a second multiplexer. The second multiplexer is configured to receive the combination optical signal, and distribute the combination optical signal into the optical signals. One of the first conversion device and the second conversion device comprises a plurality of photodetectors and a plurality of amplifiers. The plurality of photodetectors are configured to detect the optical signals, and generate the data signals according to the optical signals. The plurality of amplifiers are configured to receive the data signals, and configured to amplify the data signals.

In one embodiment, one of the first conversion device and the second conversion device further comprises an optical splitter/combiner. The optical splitter/combiner is coupled to the optical isolator and the second multiplexer, and configured to transmit the combination optical signal generated by the optical isolator to the optical fiber, wherein the optical splitter/combiner is further configured to receive the combination optical signal, and transmit the combination optical signal to the second multiplexer and the optical isolator, wherein the combination optical signal is blocked by the optical isolator.

In one embodiment, one of the first conversion device and the second conversion device comprises a first driver, a first photoelectric converter, a first optical isolator, a first photodetector, a first amplifier, and a first optical splitter/combiner. The first driver is configured to receive a first data signal of the data signals. The first driver drives the first photoelectric converter to generate a first optical signal according to the first data signal. The first optical isolator is configured to let the first optical signal pass. The first photodetector is configured to detect the first optical signal, and generate the first data signal according to the first optical signal. The first amplifier is configured to receive the first data signal, and amplify the first data signal. The first optical splitter/combiner is coupled to the first optical isolator and the first photodetector, and configured to transmit the first optical signal transmitted by the first optical isolator to the optical fiber, wherein the first optical splitter/combiner is further configured to receive the first optical signal transmitted by the optical fiber, and transmit the first optical signal to the first optical isolator and the first photodetector, wherein the first optical signal is blocked by the first optical isolator. One of the first conversion device and the second conversion device further comprises a second driver, a second photoelectric converter, a second optical isolator, a second photodetector, a second amplifier, a second optical splitter/combiner. The second driver is configured to receive a second data signal of the data signals. The second driver drives the second photoelectric converter to generate a second optical signal according to the second data signal. The second optical isolator is configured to let the second optical signal pass. The second photodetector is configured to detect the second optical signal, and generate the second data signal according to the second optical signal. The second amplifier is configured to receive the second data signal, and amplify the second data signal. The second optical splitter/combiner is coupled to the second optical isolator and the second photodetector, and configured to transmit the second optical signal transmitted by the second optical isolator to the optical fiber, wherein the second optical splitter/combiner is further configured to receive the second optical signal transmitted by the optical fiber, and transmit the second optical signal to the second optical isolator and the second photodetector, wherein the second optical signal is blocked by the second optical isolator.

In one embodiment, one of the transmit-receive terminal multiplexer of the first conversion device and the transmitting terminal multiplexer of the second conversion device further comprises a multiplexer. The multiplexer is coupled to the first optical splitter/combiner and the second optical splitter/combiner, wherein the multiplexer is configured to combine the first optical signal and the second optical signal to generate a combination optical signal, and transmit the combination optical signal to the optical fiber, or the multiplexer is configured to receive the combination optical signal transmitted by the optical fiber, and distribute the combination optical signal into the first optical signal and the second optical signal.

In one embodiment, a number of the optical fiber is plural, and the optical fibers are further configured to transmit a plurality of optical signals, wherein the first optical splitter/combiner is configured to transmit the first optical signal to the optical fibers, and the second optical splitter/combiner is configured to transmit the second optical signal to the optical fibers, and the optical fibers transmit the first optical signal and the second optical signal.

In one embodiment, the first conversion device comprises a plurality of first drivers and a plurality of first photoelectric converters. The plurality of first drivers are configured to receive the data signals. The first drivers drive the first photoelectric converters to generate the optical signals according to the data signals. The transmit-receive terminal multiplexer of the first conversion device comprises a first multiplexer. The first multiplexer is configured to receive the optical signals, and combine the optical signals to generate a first combination optical signal. The transmitting terminal multiplexer of the second conversion device comprises a second multiplexer. The second multiplexer is configured to receive the first combination optical signal, and distribute the first combination optical signal into the optical signals. The second conversion device comprises a plurality of first photodetectors and a plurality of first amplifiers. The plurality of first photodetectors are configured to detect the optical signals, and generate the data signals according to the optical signals. The plurality of first amplifiers are configured to receive the data signals, and amplify the data signals.

In one embodiment, the second conversion device further comprises a plurality of second drivers and a plurality of second photoelectric converters. The plurality of second drivers are configured to receive the data signals. The second drivers drive the second photoelectric converters to generate the optical signals according to the data signals. The transmitting terminal multiplexer of the second conversion device further comprises a third multiplexer. The third multiplexer is configured to receive the optical signals, and combine the optical signals to generate a second combination optical signal. The transmit-receive terminal multiplexer of the first conversion device further comprises a fourth multiplexer. The fourth multiplexer is configured to receive the second combination optical signal, and distribute the second combination optical signal into the optical signals. The first conversion device further comprises a plurality of second photodetectors and a plurality of second amplifiers. The plurality of second photodetectors are configured to detect the optical signals, and generate the data signals according to the optical signals. The plurality of second amplifiers are configured to receive the data signals, and amplify the data signals.

In one embodiment, one of the first conversion device and the second conversion device comprises a plurality of drivers and a plurality of photoelectric converters. The plurality of drivers are configured to receive the data signals. The drivers drive the photoelectric converters to generate the optical signals according to the data signals. One of the transmit-receive terminal multiplexer of the first conversion device and the transmitting terminal multiplexer of the second conversion device comprises a first multiplexer. The first multiplexer is configured to receive the optical signals, and combine the optical signals to generate a combination optical signal. One of the transmit-receive terminal multiplexer of the first conversion device and the transmitting terminal multiplexer of the second conversion device further comprises a second multiplexer. The second multiplexer is configured to receive the combination optical signal, and distribute the combination optical signal into the optical signals. One of the first conversion device and the second conversion device comprises a plurality of photodetectors and a plurality of amplifiers. The plurality of photodetectors are configured to detect the optical signals, and generate the data signals according to the optical signals. The plurality of amplifiers are configured to receive the data signals, and amplify the data signals.

In one embodiment, one of the first conversion device and the second conversion device further comprises a half-band filter. The half-band filter is configured to receive and transmit the combination optical signal generated by the first multiplexer to the optical fiber, and configured to receive and transmit the combination optical signal received by the optical fiber to the second multiplexer.

Therefore, based on the technical content of the present disclosure, the present disclosure provides a wireless radio frequency conversion system. The wireless radio frequency conversion system combines an antenna and a remote radio frequency equipment to be an active antenna unit (AAU), and the wireless radio frequency conversion system uses an optical fiber to transmit a data signal received by the active antenna unit to an indoor wireless radio frequency transmission device, so as to conform the need of 5G network.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Figure 1:
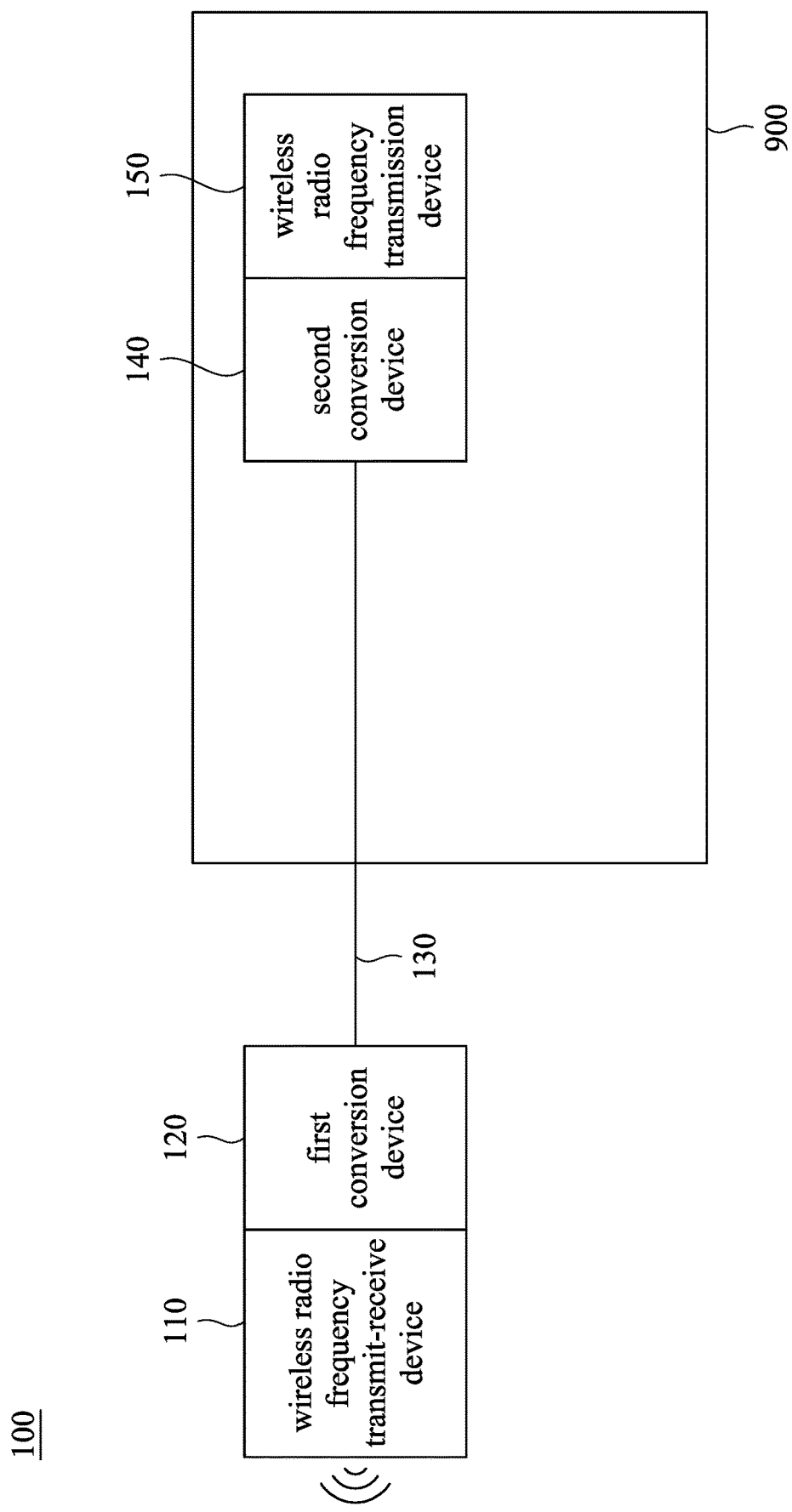
FIG. 1 depicts a schematic diagram of a wireless radio frequency conversion system which is applied to a building according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts. However, the embodiments provided herein are intended as illustrative only since numerous modifications and variations therein will be apparent to those skilled in the art. Description of the operation does not intend to limit the operation sequence. Any structures resulting from recombination of elements with equivalent effects are within the scope of the present invention.

FIG. 1 depicts a schematic diagram of a wireless radio frequency conversion system 100 which is applied to a building according to one embodiment of the present disclosure. As shown in the figure, the wireless radio frequency conversion system 100 includes a wireless radio frequency transmit-receive device 110, a first conversion device 120, an optical fiber 130, a second conversion device 140, and a wireless radio frequency transmission device 150. With respect to connection, the wireless radio frequency transmit-receive device 110 is coupled to the first conversion device 120. The first conversion device 120 is coupled to the second conversion device 140 through the optical fiber 130. The second conversion device 140 is coupled to the wireless radio frequency transmission device 150. For example, the wireless radio frequency transmit-receive device 110 and the first conversion device 120 can be disposed outdoors (e.g. the outer side of the wall of the building 900), and the second conversion device 140 and the wireless radio frequency transmission device 150 can be disposed indoors (e.g. the inner side of the building 900). The wireless radio frequency transmit-receive device 110 and the first conversion device 120 can transmit signals to the second conversion device 140 and the wireless radio frequency transmission device 150 through the optical fiber 130 in a bidirectional manner.

With respect to operations, the wireless radio frequency transmit-receive device 110 performs a conversion and a transmit-receive manner to a radio frequency signal and a data signal, and transmits the data signal to the first conversion device 120. Subsequently, the first conversion device 120 performs a conversion to the data signal and an optical signal, and transmits the optical signal to the optical fiber 130, and the optical fiber 130 will transmit the optical signal. In addition, the second conversion device 140 performs a conversion to the optical signal and the data signal, and transmits the data signal to the wireless radio frequency transmission device 150. Subsequently, the wireless radio frequency transmission device 150 performs a conversion and a transmit-receive manner to the data signal and a terminal signal, and transmits the terminal signal to user interface. It is noted that, the wireless radio frequency conversion system 100 shown in FIG. 1 can be a bidirectional transmission system. However, the present disclosure is not limited to the above-mentioned embodiments as shown in FIG. 1.

Figure 2:
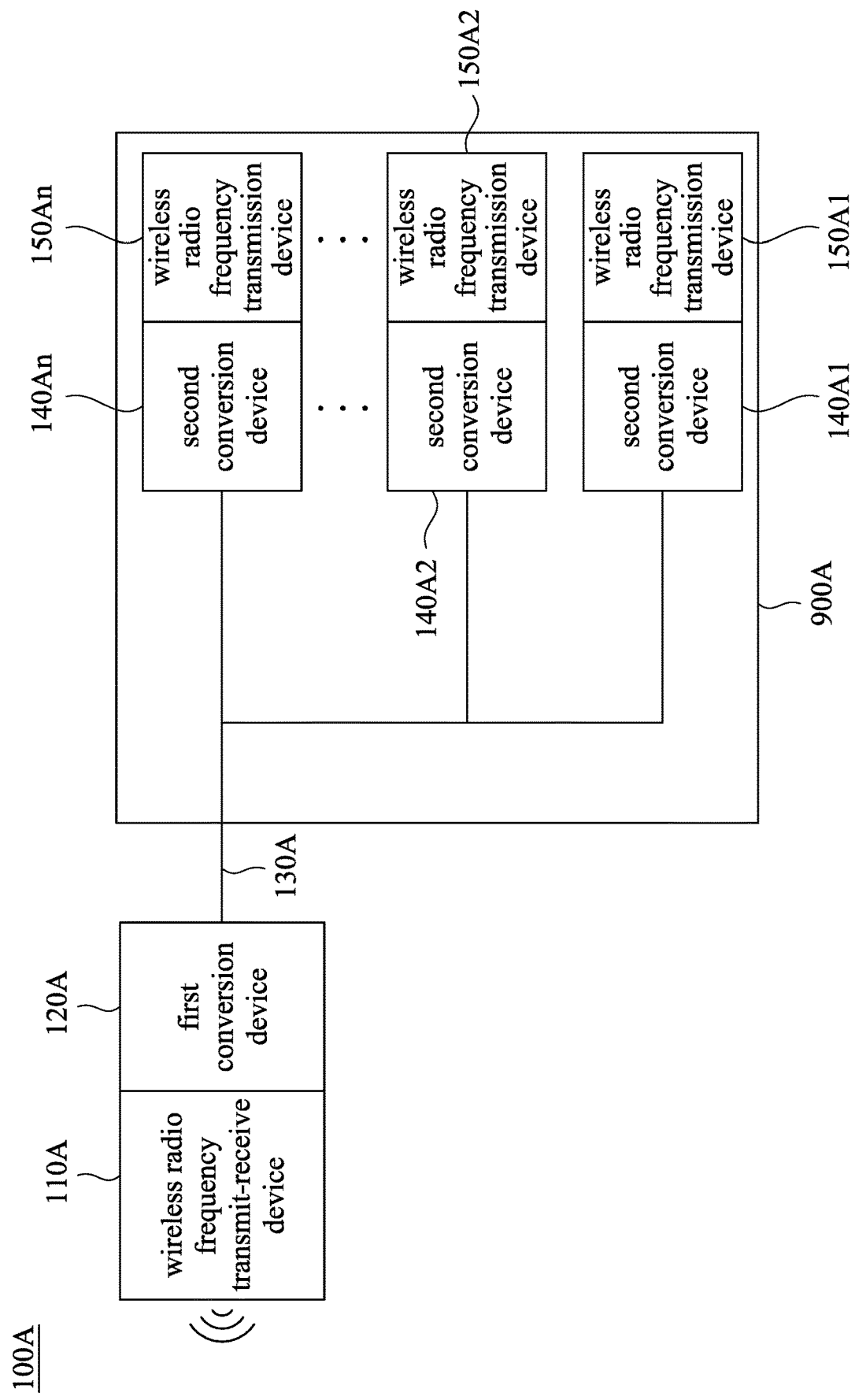
FIG. 2 depicts a schematic diagram of a wireless radio frequency conversion system which is applied to a building according to one embodiment of the present disclosure.

FIG. 2 depicts a schematic diagram of a wireless radio frequency conversion system 100A which is applied to a building according to one embodiment of the present disclosure. Compared with the wireless radio frequency conversion system 100 shown in FIG. 1, the wireless radio frequency conversion system 100A shown in FIG. 2 includes multiple second conversion devices 140A1~140An and multiple wireless radio frequency transmission devices 150A1~150An. For example, the wireless radio frequency transmit-receive device 110A and the first conversion device 120A can be disposed outdoors (e.g. the outer side of the wall of the building 900A), the wireless radio frequency transmit-receive device 110A performs a conversion and a transmit-receive manner to the radio frequency signal and the data signal, and transmits the data signal to the first conversion device 120A. The first conversion device 120A then performs a conversion to the data signal and the optical signal, and transmits the optical signal to the optical fiber 130A. The optical fiber 130A then transmits the optical signal to the second conversion devices 140A1~140An and the wireless radio frequency transmission devices 150A1~150An which are disposed indoors (e.g. the inner side of the building 900A).

Assume that the second conversion devices 140A1~140An and the wireless radio frequency transmission devices 150A1~150An are all disposed inside the building 900A. With respect to dispositions, the second conversion device 140A1 and the wireless radio frequency transmission device 150A1 can be disposed on the first floor of the building 900A, and the second conversion device 140A2 and the wireless radio frequency transmission device 150A2 can be disposed on the second floor of the building 900A. In addition, Nth second conversion device 140An and Nth wireless radio frequency transmission device 150An can be disposed on Nth floor, and the number N can be arranged depending on actual requirements. In this disposition, the optical fiber 130A can transmit the optical signals to the second conversion devices 140A1~140An which are disposed on N floors. The second conversion devices 140A1~140An perform a conversion to the optical signals and the data signals, and transmit the data signals to corresponding wireless radio frequency transmission devices 150A1~150An. Subsequently, the wireless radio frequency transmission devices 150A1~150An perform a conversion and a transmit-receive manner to the data signals and the terminal signals, and transmit the terminal signals to user interface. It is noted that, the wireless radio frequency conversion system 100A shown in FIG. 2 can be a bidirectional transmission system. However, the present disclosure is not limited to the above-mentioned embodiments as shown in FIG. 2.

Figure 3:
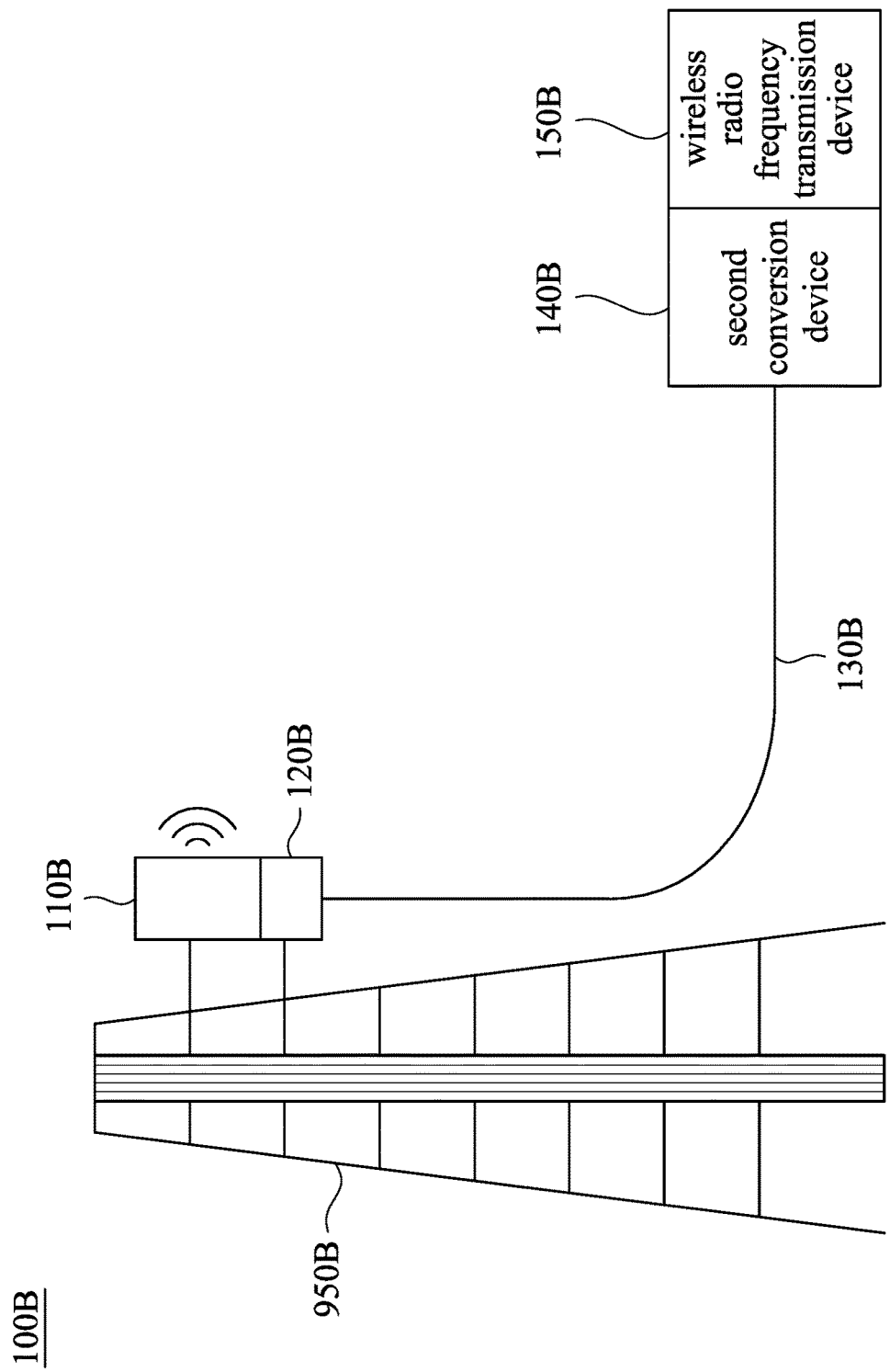
FIG. 3 depicts a schematic diagram of a wireless radio frequency conversion system which is applied outdoors according to one embodiment of the present disclosure.

FIG. 3 depicts a schematic diagram of a wireless radio frequency conversion system 100B which is applied to an outdoor according to one embodiment of the present disclosure. As shown in the figure, the wireless radio frequency transmit-receive device 110B and the first conversion device 120B of the wireless radio frequency conversion system 100B can be disposed on an antenna tower 950 which is disposed outdoors. The second conversion device 140B and the wireless radio frequency transmission device 150B can be disposed indoors. The wireless radio frequency transmit-receive device 110B and the first conversion device 120B can transmit signals to the second conversion device 140B and the wireless radio frequency transmission device 150B through the optical fiber 130B in a bidirectional manner. It is noted that, the element in FIG. 3, whose symbol is similar to the symbol of the element in FIG. 1, has similar structure feature in connection with the element in FIG. 1. Therefore, a detail description regarding the structure feature of the element in FIG. 3 is omitted herein for the sake of brevity. Furthermore, the present disclosure is not limited to the structure as shown in FIG. 3, and it is merely an example for illustrating one of the implements of the present disclosure.

Figure 4:
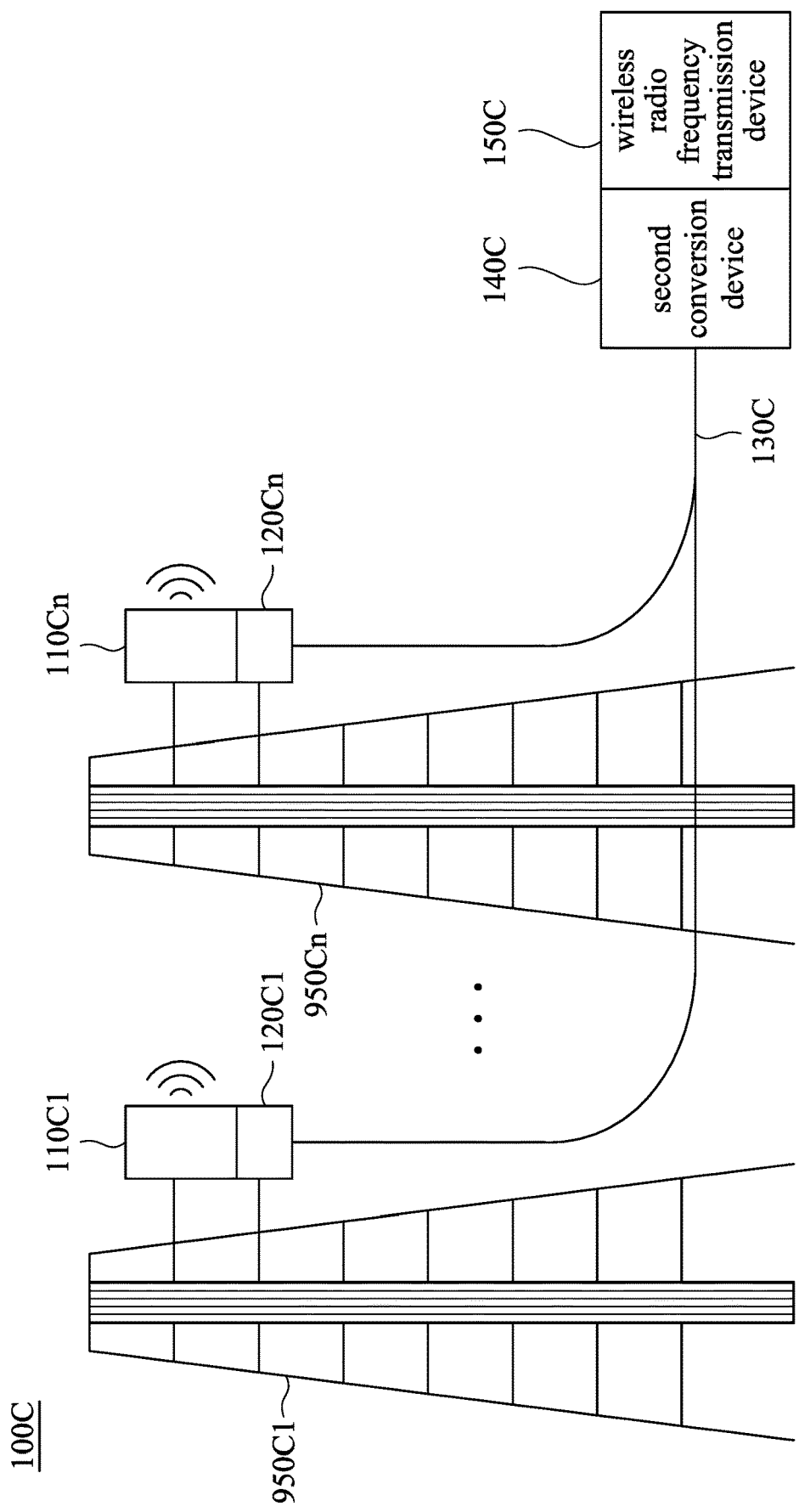
FIG. 4 depicts a schematic diagram of a wireless radio frequency conversion system which is applied outdoors according to one embodiment of the present disclosure.

FIG. 4 depicts a schematic diagram of a wireless radio frequency conversion system 100C which is applied to an outdoor according to one embodiment of the present disclosure. Compared with the wireless radio frequency conversion system 100B which is applied outdoors shown in FIG. 3, the wireless radio frequency conversion system 100C which is applied outdoors shown in FIG. 4 includes multiple wireless radio frequency transmit-receive devices 110C1~110Cn and multiple first conversion devices 120C1~120Cn. The wireless radio frequency transmit-receive devices 110C1~110Cn, and the first conversion devices 120C1~120Cn can be disposed on antenna towers 950C1~950Cn which are disposed outdoors. For example, the wireless radio frequency transmit-receive device 110C1 and the first conversion device 120C1 can be disposed on the antenna tower 950C1 which is disposed outdoors, and the wireless radio frequency transmit-receive device 110Cn and the first conversion device 120Cn can be disposed on the antenna tower 950Cn which is disposed outdoors. The second conversion device 140C and the wireless radio frequency transmission device 150C can be disposed indoors. The devices which are disposed outdoors and devices which are disposed indoors can transmit signals through the optical fiber 130C in a bidirectional manner. It is noted that, the element in FIG. 4, whose symbol is similar to the symbol of the element in FIG. 1, has similar structure feature in connection with the element in FIG. 1. Therefore, a detail description regarding the structure feature of the element in FIG. 4 is omitted herein for the sake of brevity. Furthermore, the present disclosure is not limited to the structure as shown in FIG. 4, and it is merely an example for illustrating one of the implements of the present disclosure.

Figure 5:
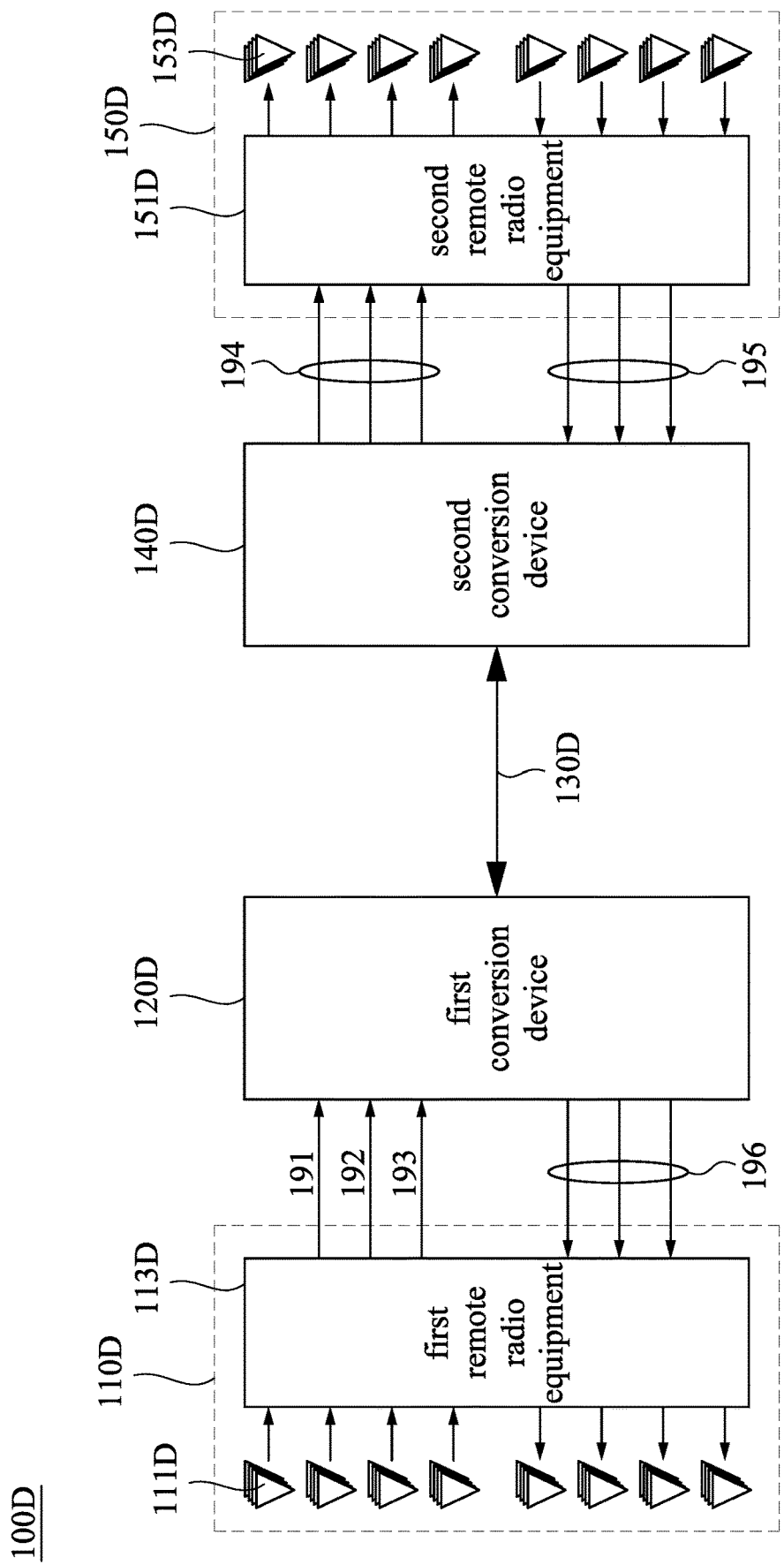
FIG. 5 depicts a schematic diagram of a wireless radio frequency conversion system according to one embodiment of the present disclosure.

FIG. 5 depicts a schematic diagram of a wireless radio frequency conversion system 100D according to one embodiment of the present disclosure. As shown in the figure, the wireless radio frequency transmit-receive device 110D includes at least one first antenna 111D and a first remote radio equipment 113D. Besides, the wireless radio frequency transmission device 150D includes a second remote radio equipment 151D and at least one second antenna 153D.

With respect to operations, the at least one first antenna 111D is configured to transmit and receive a radio frequency signal. Subsequently, the first remote radio equipment 113D receives the radio frequency signal, and generates a data signal. Next, the data signal is transmitted to the second remote radio equipment 151D through the first conversion device 120D, the optical fiber 130D, and the second conversion device 140D. Finally, the second remote radio equipment 151D receives the data signal, and generates a terminal signal. The at least one second antenna 153D receives the terminal signal, and transmits the terminal signal. For example, the first remote radio equipment 113D can be a Remote Radio Unit (RRU). The first antenna 111D receives a Radio Frequency (RF) millimeter wave signal, and the RRU 113D performs processing such as amplifying, filtering, and switching to the RF millimeter wave signal, so as to generate the data signal. The data signal can be electrical signals, for example, a communication signal 191, a control signal 192, an oscillator signal 193, and so on. The communication signal 191 can be a millimeter wave high frequency signal, an intermediate frequency signal, a backhaul transmitting signal, and an IQ signal.

Next, the RRU 113D transmits the electrical signals, for example, the communication signal 191, the control signal 192, the oscillator signal 193, to the first conversion device 120D. The first conversion device 120D converts the electrical signals into an optical signal, and transmits to the second conversion device 140D through the optical fiber 130D. The optical fiber 130D can be one or multiple optical fibers, such that the optical signals can be transmitted between the first conversion device 120D and the second conversion device 140D. Subsequently, the second conversion device 140D converts the optical signal into the electrical signal 194, and transmits to the second remote radio equipment 151D. For example, the second remote radio equipment 151D can also be a RRU, and the RRU 151D converts the electrical signal 194 into the terminal signal. The at least one second antenna 153D is configured to transmit and receive the terminal signal. The terminal signal can be a millimeter wave high frequency signal.

It is noted that, the wireless radio frequency conversion system 100D shown in FIG. 5 can be a bidirectional transmission system. For example, the at least one second antenna 153D receives a RF millimeter wave to generate a RF millimeter signal. The second remote radio equipment 151D receives the RF millimeter signal to generate the electrical signal 195. Next, the second remote radio equipment 151D transmits the electrical signal 195 to the second conversion device 140D. The second conversion device 140D converts the electrical signal 195 into the optical signal, and transmits to the first conversion device 120D through the optical fiber 130D. Subsequently, the first conversion device 120D converts the optical signal into the electrical signal 196, and transmits to the first remote radio equipment 113D.

In one embodiment, the wireless radio frequency conversion system 100D further includes a radio frequency transceiver. The radio frequency transceiver can be disposed in the first remote radio equipment 113D or disposed in the second remote radio equipment 151D depending on actual requirements. The radio frequency transceiver can be configured to perform an analog signal to digital signal conversion. It is noted that the present disclosure is not limited to the above-mentioned embodiments as shown in FIG. 5.

Figure 6:
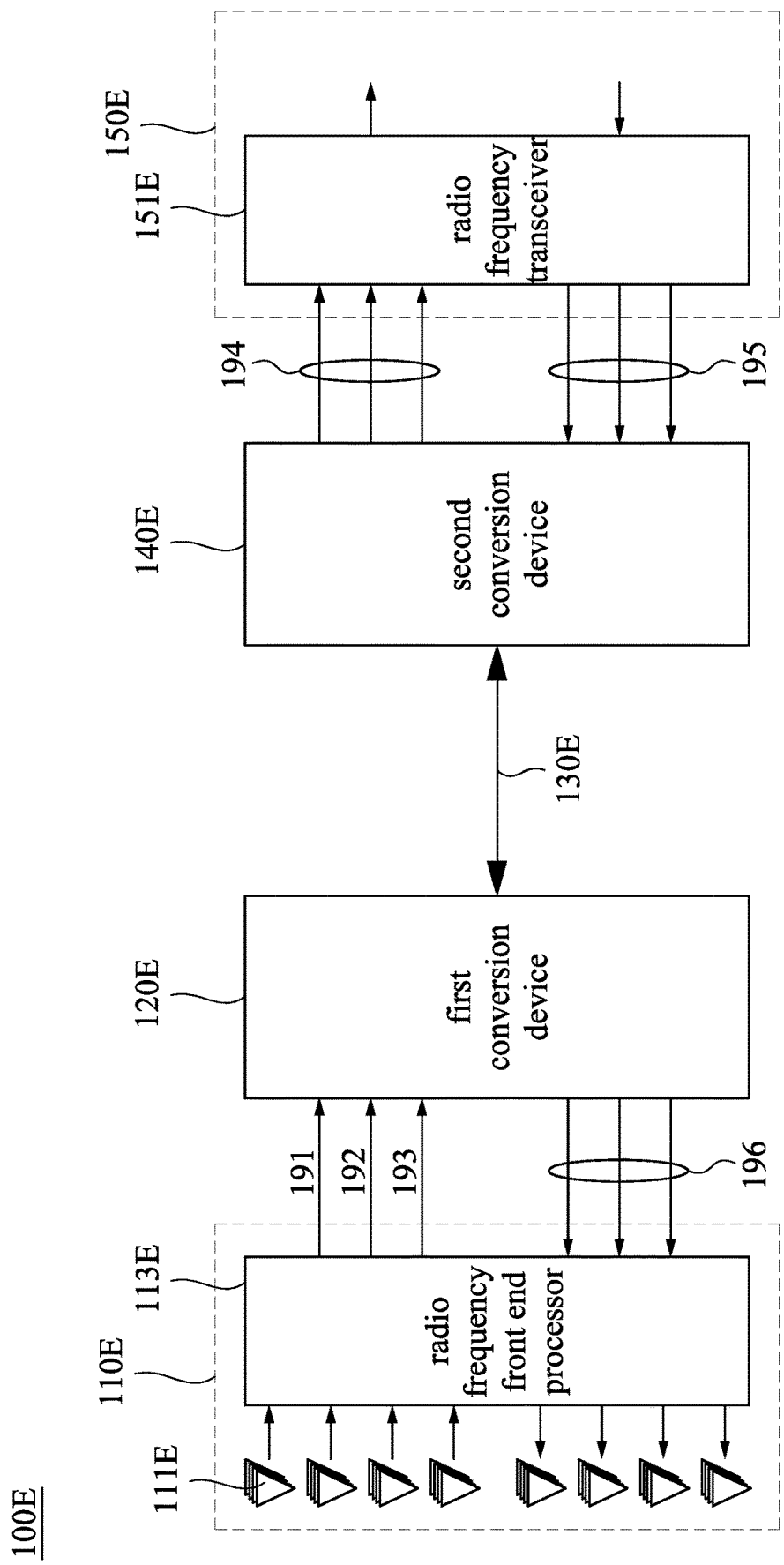
FIG. 6 depicts a schematic diagram of a wireless radio frequency conversion system according to one embodiment of the present disclosure.

FIG. 6 depicts a schematic diagram of a wireless radio frequency conversion system 100E according to one embodiment of the present disclosure. As shown in the figure, the wireless radio frequency transmit-receive device 110E includes at least one first antenna 111E and a radio frequency front end processor 113E. The wireless radio frequency transmission device 150E includes a radio frequency transceiver 151E.

With respect to operations, the at least one first antenna 111E is configured to transmit and receive a radio frequency signal. Subsequently, the radio frequency front end processor 113E receives the radio frequency signal, and performs a front end signal processing to the radio frequency signal to generate a data signal. Next, the data signal is transmitted to the radio frequency transceiver 151E through the first conversion device 120E, the optical fiber 130E, and the second conversion device 140E. Finally, the radio frequency transceiver 151E receives the data signal, converts the data signal from an analog signal into a digital signal to generate a terminal signal, and transmits the converted terminal signal. At this time, the terminal signal is the digital signal. For example, the at least one first antenna 111E transmits and receives a RF millimeter signal, and the radio frequency front end processor (e.g. Radio Frequency Front End Unit, RFFE) 113E performs a front end processing such as filtering, switching to the RF millimeter signal, so as to generate the data signal. The data signal can be electrical signals, for example, a communication signal 191, a control signal 192, an oscillator signal 193, and so on. The communication signal 191 can be a millimeter wave high frequency signal or an intermediate frequency signal.

Next, the radio frequency front end processor 113E transmits the electrical signals, for example, the communication signal 191, the control signal 192, the oscillator signal 193, and so on, to the first conversion device 120E. The first conversion device 120E converts the electrical signal into an optical signal, and transmits to the second conversion device 140E through the optical fiber 130E. The optical fiber 130E can be one or multiple optical fibers, such that the optical signal can be transmitted between the first conversion device 120E and the second conversion device 140E. Subsequently, the second conversion device 140E converts the optical signal into the electrical signal 194, and transmits to the radio frequency transceiver 151E. After the radio frequency transceiver 151E converts a millimeter wave high frequency signal or an intermediate frequency signal into digital signals, for example, a backhaul transmitting signal or an IQ signal, the digital signals are transmitted to a Baseband Unit (BBU).

It is noted that, the wireless radio frequency conversion system 100E shown in FIG. 6 can be a bidirectional transmission system. For example, when the radio frequency transceiver 151E receives the IQ signal transmitted from the baseband unit, the radio frequency transceiver 151E converts the IQ signal into the electrical signal 195. Next, the radio frequency transceiver 151E transmits the electrical signal 195 to the second conversion device 140E. The second conversion device 140E converts the electrical signal 195 into the optical signal, and transmits to the first conversion device 120E through the optical fiber 130E. Subsequently, the first conversion device 120E converts the optical signal into the electrical signal 196, and transmits to the radio frequency front end processor 113E. It is noted that the present disclosure is not limited to the above-mentioned embodiments as shown in FIG. 6.

Figure 7:
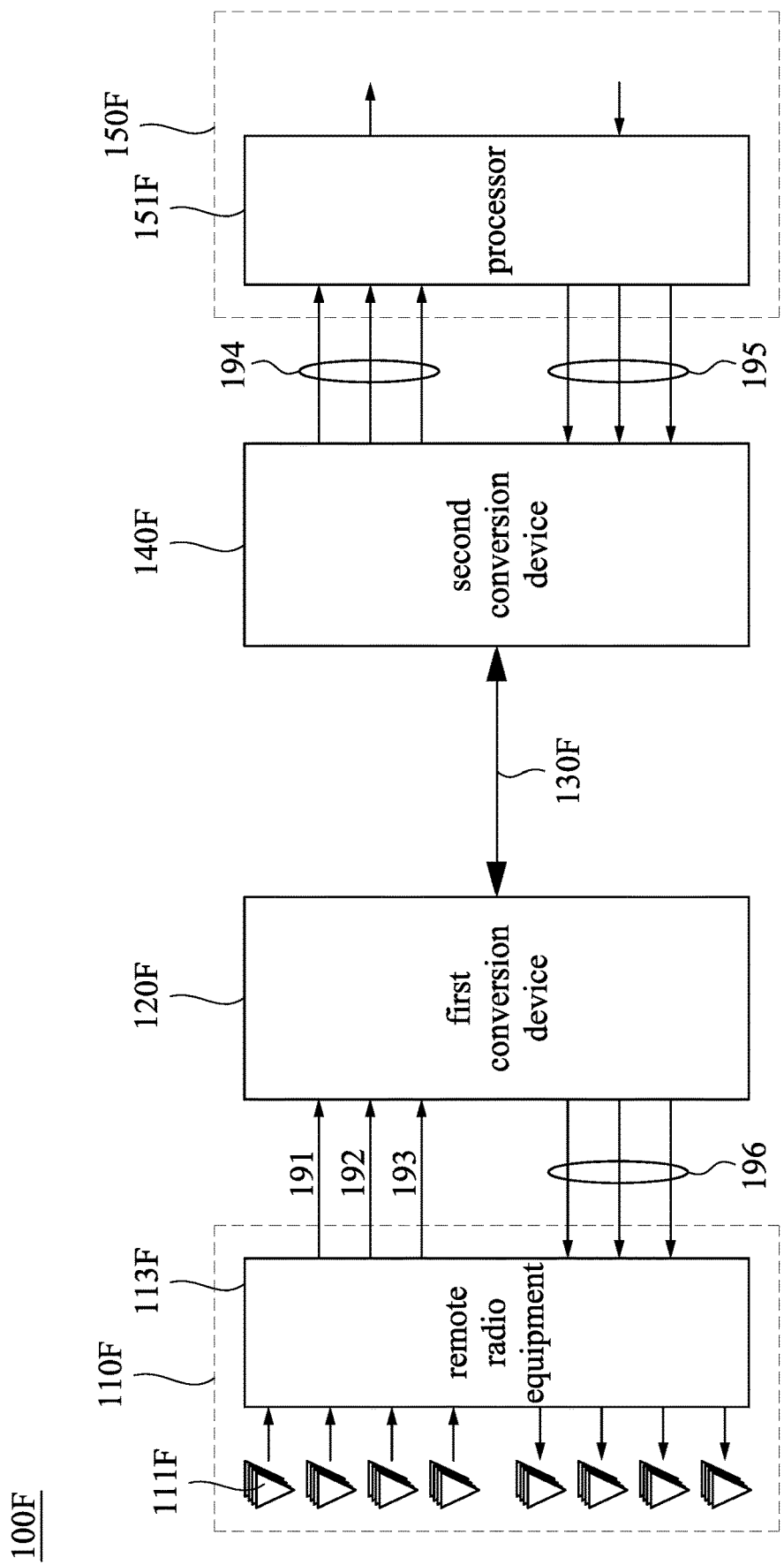
FIG. 7 depicts a schematic diagram of a wireless radio frequency conversion system according to one embodiment of the present disclosure.

FIG. 7 depicts a schematic diagram of a wireless radio frequency conversion system 100F according to one embodiment of the present disclosure. As shown in the figure, the wireless radio frequency transmit-receive device 110F includes at least one first antenna 111F and a remote radio equipment 113F. The wireless radio frequency transmission device 150F includes a processor 151F.

With respect to operations, the at least one first antenna 111F is configured to transmit and receive a radio frequency signal. Subsequently, the remote radio equipment 113F is configured to receive the radio frequency signal, and generate a data signal. Next, the data signal is transmitted to the processor 151F through the first conversion device 120F, the optical fiber 130F, and the second conversion device 140F. Finally, the processor 151F is configured to receive the data signal, perform a signal processing to the data signal for generating a terminal signal, and transmit the terminal signal. At this time, the terminal signal can be a digital signal. For example, the remote radio equipment 113F can be a Remote Radio Unit (RRU). The at least one first antenna 111F transmits and receives a RF millimeter signal, and the remote radio equipment 113F performs a processing such as amplifying, filtering, switching to the RF millimeter signal, so as to generate the data signal. The data signal can be electrical signals, for example, a communication signal 191, a control signal 192, an oscillator signal 193, and so on. The communication signal 191 can be a millimeter wave high frequency signal, an intermediate frequency signal, a backhaul transmitting signal, and an IQ signal.

Next, the RRU 113F transmits the electrical signals, for example, the communication signal 191, the control signal 192, the oscillator signal 193, and so on, to the first conversion device 120F. The first conversion device 120F converts the electrical signal into the optical signal, and transmits to the second conversion device 140F through the optical fiber 130F. The optical fiber 130F can be one or multiple optical fibers, such that the optical signal can be transmitted between the first conversion device 120F and the second conversion device 140F. Subsequently, the second conversion device 140F converts the optical signal into the electrical signal 194, and transmits to the processor 151F. For example, the processor 151F can be a baseband unit (BBU), a centralized unit (CU), or a distribute unit (DU). The processor 151F converts the electrical signal 194 into the terminal signal, and transmits to a backhaul network.

It is noted that, the wireless radio frequency conversion system 100F shown in FIG. 7 can be a bidirectional transmission system. For example, when the processor 151F receives the electrical signal transmitted from the backhaul network, the processor 151F converts the electrical signal into the electrical signal 195. Next, the processor 151F transmits the electrical signal 195 to the second conversion device 140F. The second conversion device 140F converts the electrical signal 195 into the optical signal, and transmits to the first conversion device 120F through the optical fiber 130F. Subsequently, the first conversion device 120F converts the optical signal into the electrical signal 196, and transmits to the RRU 113F.

In one embodiment, the wireless radio frequency conversion system 100F further includes the radio frequency transceiver, and the radio frequency transceiver can be disposed in the remote radio equipment 113F or disposed in the processor 151F depending to actual requirements. The radio frequency transceiver can be configured to perform an analog signal to digital signal conversion. It is noted that the present disclosure is not limited to the above-mentioned embodiments as shown in FIG. 7.

Figure 8:
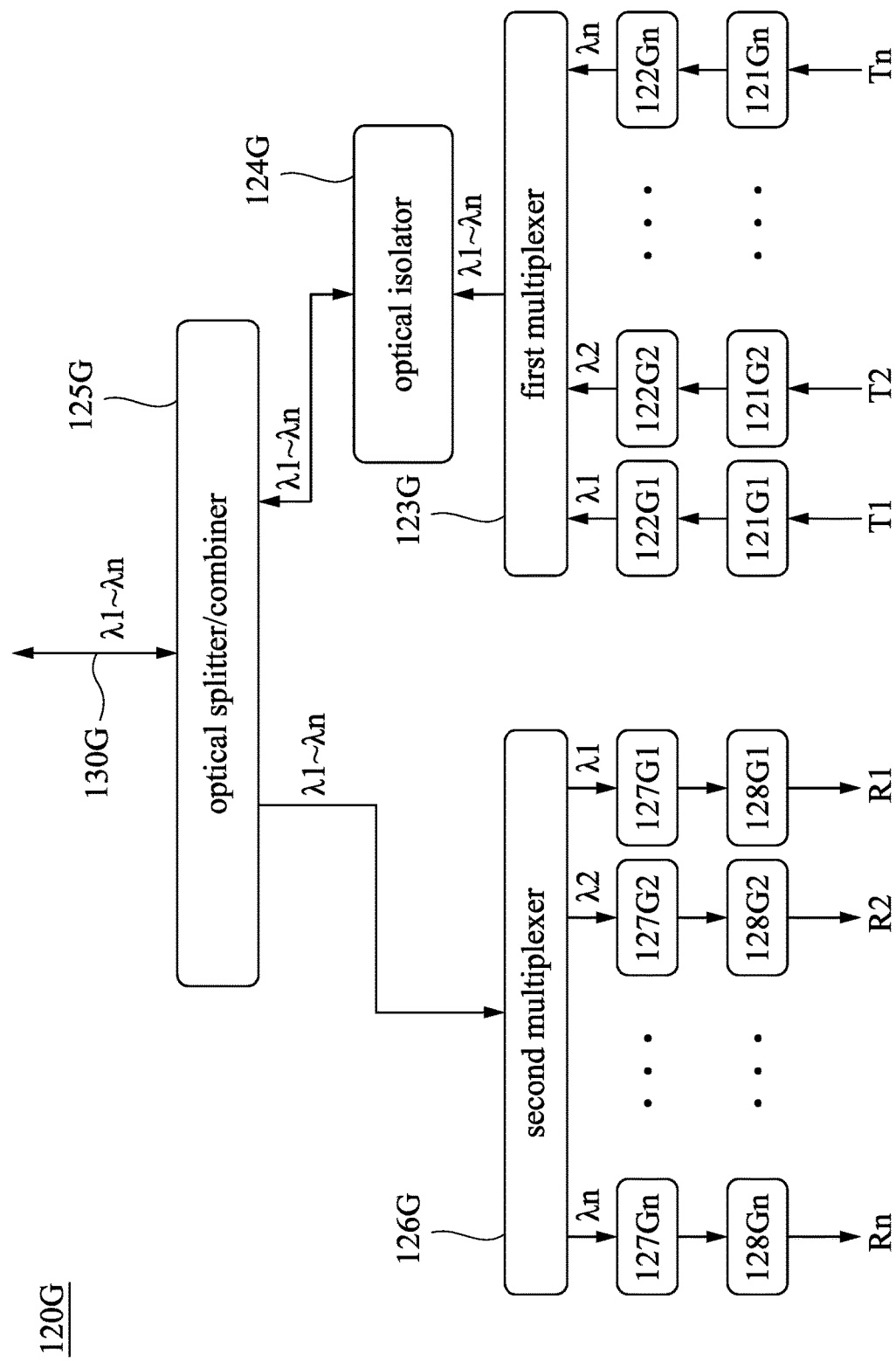
FIG. 8 depicts a schematic diagram of a conversion device of a wireless radio frequency conversion system according to one embodiment of the present disclosure.

FIG. 8 depicts a schematic diagram of conversion devices 120, 140 of the wireless radio frequency conversion system 100 shown in FIG. 1 according to one embodiment of the present disclosure. It is noted that, the conversion device 120G shown in FIG. 8 is configured to illustrate the first conversion device 120 or the second conversion device 140 of FIG. 1. Reference is now made to both FIG. 1 and FIG. 8, the wireless radio frequency transmit-receive device 110 is configured to receive a plurality of radio frequency signals, and generate a plurality of data signals T1~Tn. The conversion device 120G includes a plurality of drivers 121G1~121Gn, a plurality of photoelectric converters 122G1~122Gn, a first multiplexer 123G, and an optical isolator 124G.

Besides, the conversion device 120G further includes an optical splitter/combiner 125G, a second multiplexer 126G, a plurality of photodetectors 127G1~127Gn, and a plurality of amplifiers 128G1~128Gn. The optical splitter/combiner 125G is coupled to the optical isolator 124G and the second multiplexer 126G. With respect to operations, the drivers 121G1~121Gn receive the data signals T1~Tn. The drivers 121G1~121Gn drive the photoelectric converters 122G1~122Gn to generate the optical signals λ1~λn with different optical wavelengths according to the data signals T1~Tn. The first multiplexer 123G receives multiple optical signals λ1~λn, and combines the multiple optical signals λ1~λn to generate a combination optical signal λ 1~λn. The optical isolator 124G can only let the combination optical signal λ 1~λn of the first multiplexer 123G pass, and block the combination optical signal λ1~λn transmitted from the optical splitter/combiner 125G. In other words, the optical isolator 124G provides a one way transmission. Subsequently, the optical splitter/combiner 125G transmits the combination optical signal λ1~λn to the optical fiber 130G.

For another point of view, the optical splitter/combiner 125G receives the combination optical signal λ1~λn from the optical fiber 130G, and transmits the combination optical signal λ1~λn to the second multiplexer 126G and the optical isolator 124G. The second multiplexer 126G distributes the combination optical signal λ1~λn into multiple optical signals λ1~λn with different optical wavelengths. If the optical splitter/combiner 125G wants to transmit the combination optical signal λ1~λn to the right side transmitting path, it will be blocked by the optical isolator 124. Next, the photodetectors 127G1~127Gn detect multiple optical signals λ1~λn, and generate multiple data signals R1~Rn according to multiple optical signals λ1~λn. The amplifiers 128G1~128Gn receive the data signals R1~Rn, and are configured to amplify the data signals R1~Rn. The first multiplexer 123G and the second multiplexer 126G can be a Wavelength Division Multiplexer (WDM). It is noted that the present disclosure is not limited to the above-mentioned embodiments as shown in FIG. 8.

Figure 9:
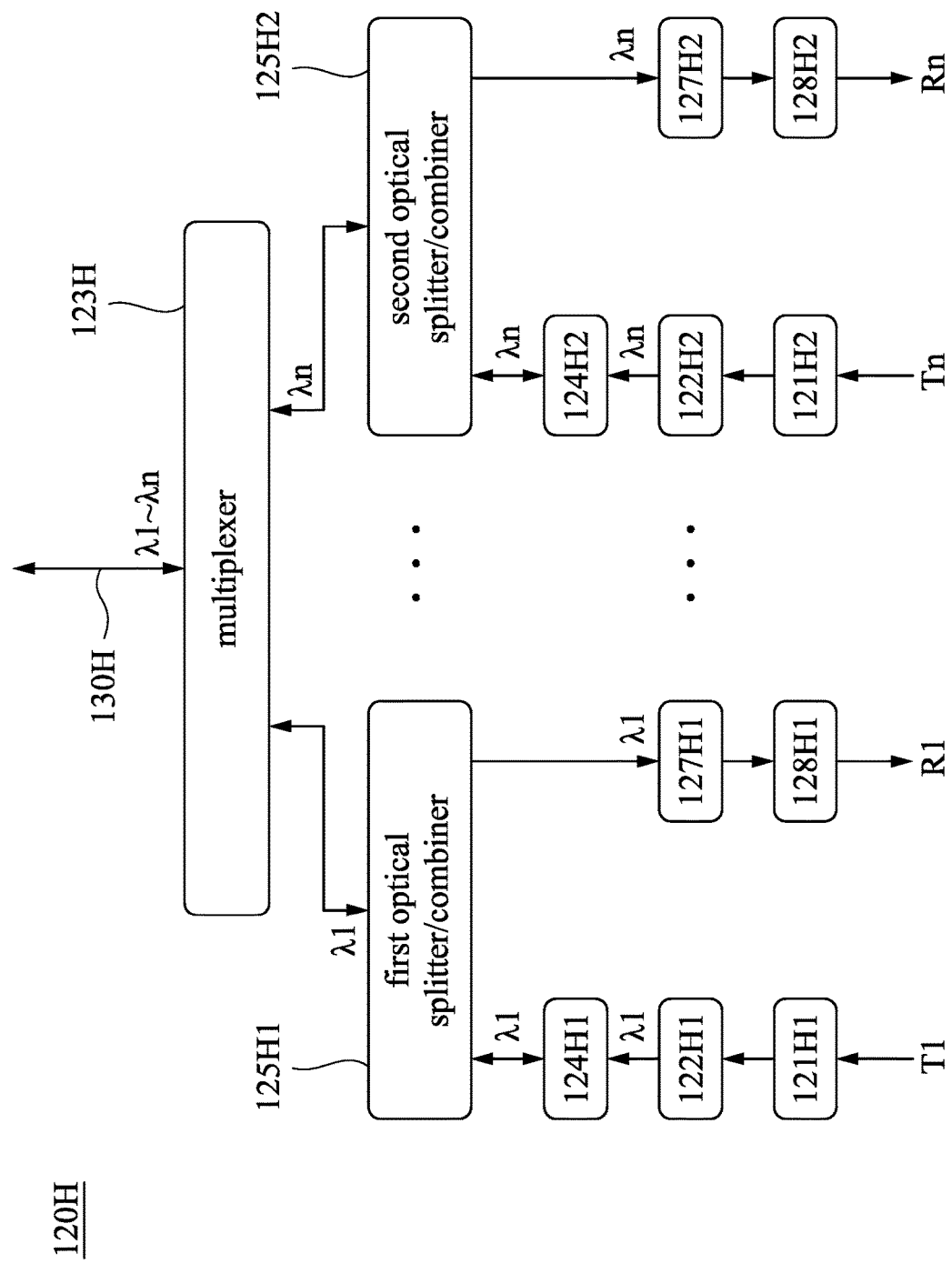
FIG. 9 depicts a schematic diagram of a conversion device of a wireless radio frequency conversion system according to one embodiment of the present disclosure.

FIG. 9 depicts a schematic diagram of conversion devices 120, 140 of the wireless radio frequency conversion system 100 shown in FIG. 1 according to one embodiment of the present disclosure. It is noted that, the conversion device 120H shown in FIG. 9 is configured to illustrate the first conversion device 120 or the second conversion device 140 in FIG. 1. Reference is now made to both FIG. 1 and FIG. 9, the wireless radio frequency transmit-receive device 110 is configured to receive a plurality of radio frequency signals, and generate a plurality of data signals T1~Tn. The conversion device 120H includes a first driver 121H1, a first photoelectric converter 122H1, a first optical isolator 124H1, a first photodetector 127H1, a first amplifier 128H1, a first optical splitter/combiner 125H1, and a multiplexer 123H. With respect to operations, the first driver 121H1 receives a first data signal T1. The first driver 121H1 drives the first photoelectric converter 122H1 to generate a first optical signal λ1 according to the first data signal T1. The first optical isolator 124H1 can only let the first optical signal λ1 pass, and block the first optical signal λ1 transmitted from the multiplexer 123H. In other words, the first optical isolator 124H1 provides a one way transmission. As shown in the figure, the first optical splitter/combiner 125H1 is coupled to the first optical isolator 124H1 and the first photodetector 127H1, and configured to transmit the first optical signal λ1 transmitted by the first optical isolator 124H1 to the multiplexer 123H. The optical fiber 130H performs a transmission. Besides, the first optical splitter/combiner 125H1 is further configured to receive the first optical signal λ1 transmitted from the multiplexer 123H through the optical fiber 130H, and transmit the first optical signal λ1 to the first photodetector 127H1 and the first optical isolator 124H1. Next, the first photodetector 127H1 detects the first optical signal λ1, and generates the first data signal R1 according to the first optical signal λ1. The first amplifier 128H1 receives the first data signal R1, and amplify the first data signal R1. In addition, the first optical signal λ1 will be blocked by the first optical isolator 124H1.

Besides, the conversion device 120H further includes a second driver 121H2, a second photoelectric converter 122H2, a second optical isolator 124H2, a second photodetector 127H2, a second amplifier 128H2, and a second optical splitter/combiner 125H2. The second driver 121H2 receives a second data signal Tn. The second driver 121H2 drives the second photoelectric converter 122H2 to generate the second optical signal 2L n according to the second data signal Tn. The second optical isolator 124H2 can only let the second optical signal 2L n pass, and the second optical signal n transmitted from the multiplexer 123H will be blocked. In other words, the second optical isolator 124H2 provides a one way transmission. As shown in the figure, the second optical splitter/combiner 125H2 is coupled to the second optical isolator 124H2 and the second photodetector 127H2, and configured to transmit the second optical signal 2L n transmitted from the second optical isolator 124H2 to the multiplexer 123H. The multiplexer 123H combines the first optical signal λ1, the second optical signal λn, and other optical signals to generate a combination optical signal λ1~λn, and the optical fiber 130H performs a transmission. Besides, the second optical splitter/combiner 125H2 is further configured to receive the second optical signal λn transmitted from the multiplexer 123H through the optical fiber 130H, and transmit the second optical signal λn to the second photodetector 127H2 and the second optical isolator 124H2. Next, the second photodetector 127H2 is configured to detect the second optical signal λn, and generate the second data signal Rn according to the second optical signal λn. The second amplifier 128H2 receives the second data signal Rn, and amplify the second data signal Rn. In addition, the second optical signal λn will be blocked by the second optical isolator 124H2. The multiplexer 123H can be a Wavelength Division Multiplexer (WDM). It is noted that the present disclosure is not limited to the above-mentioned embodiments as shown in FIG. 9.

Figure 10:
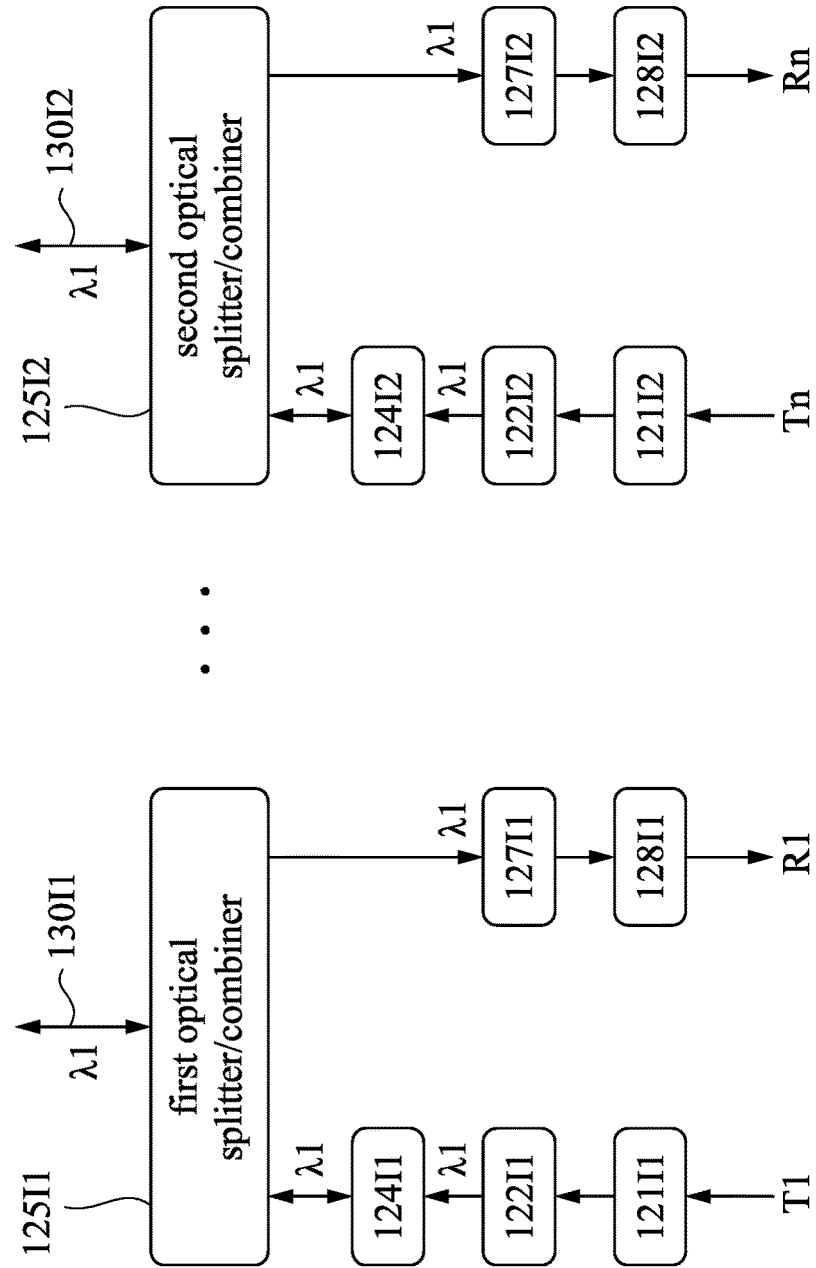
FIG. 10 depicts a schematic diagram of a conversion device of a wireless radio frequency conversion system according to one embodiment of the present disclosure.

FIG. 10 depicts a schematic diagram of conversion devices 120, 140 of the wireless radio frequency conversion system 100 shown in FIG. 1 according to one embodiment of the present disclosure. Compared with the conversion device 120H shown in FIG. 9, the conversion device 120I in FIG. 10 does not need the multiplexer 123H for combining the multiple optical signal λ1 to generate the combination optical signal λ1~λn. In FIG. 10, the wireless radio frequency conversion system 100 includes multiple optical fibers 130I1~130I2, and these optical fibers 130I1~130I2 can be configured to transmit a plurality of optical signals. Therefore, the first optical signal λ1 generated by the first optical splitter/combiner 125I1 and the second optical signal λ1 generated by the second optical splitter/combiner 125I2 can be transmitted by the optical fiber 130I1~130I2, and the optical fibers 130I1~130I2 transmit the first optical signal λ1 and the second optical signal λ1. It is noted that, the element in FIG. 10, whose symbol is similar to the symbol of the element in FIG. 9, has similar structure feature in connection with the element in FIG. 9. Therefore, a detail description regarding the structure feature of the element in FIG. 10 is omitted herein for the sake of brevity. Furthermore, the present disclosure is not limited to the structure as shown in FIG. 10, and it is merely an example for illustrating one of the implements of the present disclosure.

Figure 11:
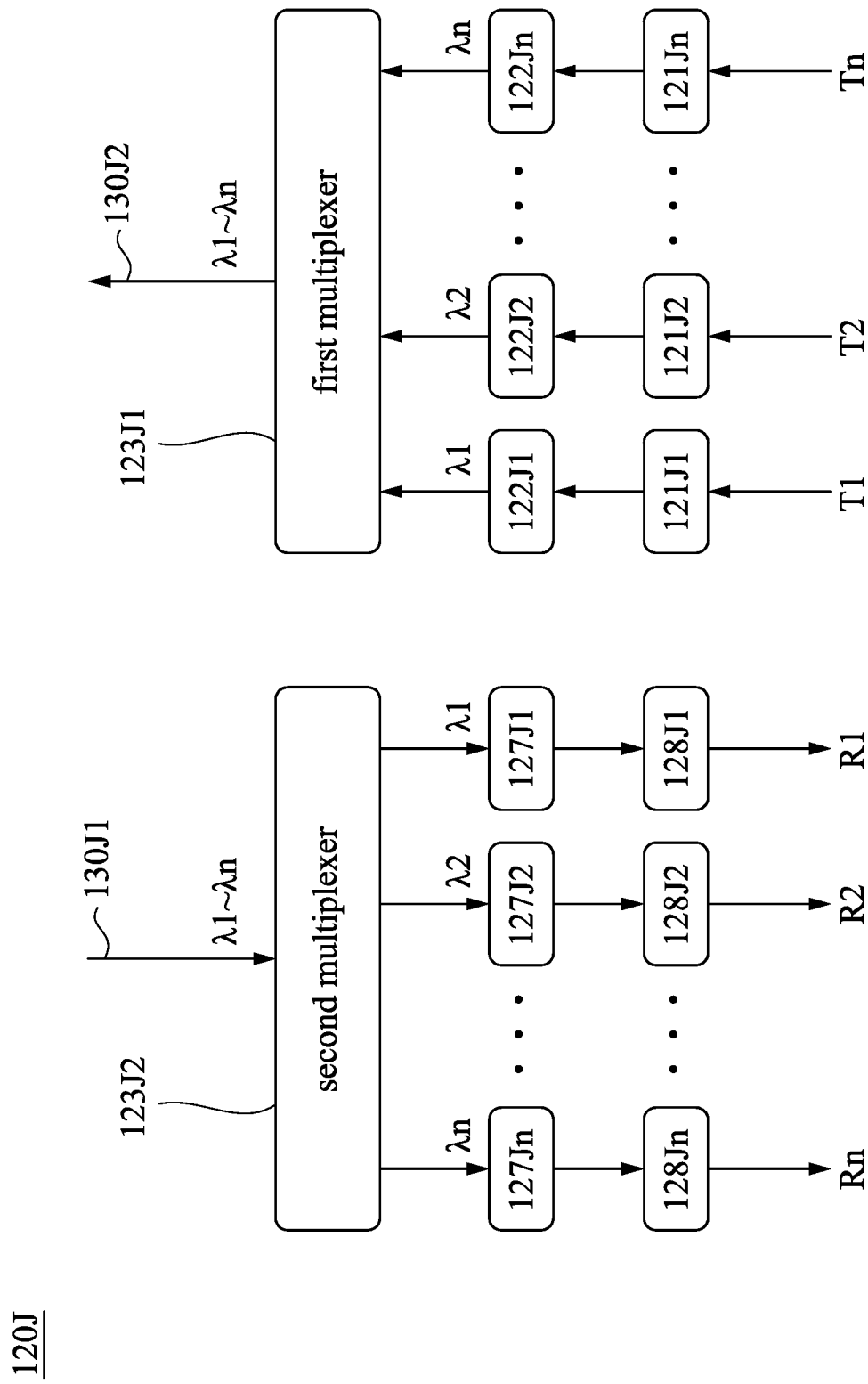
FIG. 11 depicts a schematic diagram of a conversion device of a wireless radio frequency conversion system according to one embodiment of the present disclosure.

FIG. 11 depicts a schematic diagram of conversion devices 120, 140 of the wireless radio frequency conversion system 100 shown in FIG. 1 according to one embodiment of the present disclosure. Reference is now made to both FIG. 1 and FIG. 11, the wireless radio frequency transmit-receive device 110 is configured to receive a plurality of radio frequency signals, and generate a plurality of data signals T1~Tn. The first conversion device 120 shown in FIG. 1 includes a plurality of first drivers 121J1~121Jn shown in the right side of the conversion device 120J, a plurality of first photoelectric converters 122J1~122Jn, and a first multiplexer 123J1 in FIG. 11.

With respect to operations, the first drivers 121J1~121Jn drive the first photoelectric converter 122J1~122Jn to generate multiple the optical signals λ1~λn with different optical wavelengths according to the data signals T1λTn. The first multiplexer 123J1 receives multiple optical signals λ1~λn, and combines multiple optical signals λ1~λn to generate a first combination optical signal λ1~λn.

Besides, the second conversion device 140 shown in FIG. 1 includes the second multiplexer 123J2 shown in the left side of the conversion device 120J, a plurality of first photodetectors 127J1~127Jn, and a plurality of first amplifiers 128J1~128Jn in FIG. 11. With respect to operations, the second multiplexer 123J2 receives the first combination optical signal λ1~λn transmitted by the first conversion device 120 shown in FIG. 1, and distributes the first combination optical signals λ1~λn into multiple optical signals λ1~λn with different optical wavelengths. Next, the first photodetectors 127J1~127Jn detect multiple optical signals λ1~λn, and generates the data signals R1-Rn according to multiple optical signals λ1~λn. The first amplifiers 128J1~128Jn receive the data signals R1~Rn, and amplify the data signals R1~Rn.

In addition, the second conversion device 140 shown in FIG. 1 includes a plurality of second drivers 121J1~121Jn shown in the right side of the conversion device 120J, a plurality of second photoelectric converters 122J1~122Jn, and the first multiplexer 123J1 in FIG. 11. With respect to operations, the second drivers 121J1~121Jn receive the data signals T1~Tn. The second drivers 121J1~121Jn drive the second photoelectric converters 122J1~122Jn to generate multiple optical signals λ1~λn with different optical wavelengths according to the data signals T1~Tn. The first multiplexer 123J1 receives multiple optical signals λ1~λn, and combines multiple optical signals λ1~λn to generate the second combination optical signal λ1~λn.

Besides, the first conversion device 120 shown in FIG. 1 further includes the second multiplexer 123J2 shown in the left side of the conversion device 120J, a plurality of second photodetectors 127J1~127Jn, and a plurality of second amplifiers 128J1~128Jn in FIG. 11. With respect to operations, the second multiplexer 123J2 receives the second combination optical signal λ1~λn transmitted from the second conversion device 140 shown in FIG. 1, and distributes the second combination optical signal λ1~λn into multiple optical signals λ1~λn with different optical wavelengths. Next, the second photodetectors 127J1~127Jn detect multiple optical signals λ1~λn, and generate the data signals R1~Rn according to multiple optical signals λ1~λn. The second amplifiers 128J1~128Jn are configured to receive the data signals R1~Rn, and amplify the data signals R1~Rn. In one embodiment, the first multiplexer 123J1 and the second multiplexer 123J2 can be a Wavelength Division Multiplexer (WDM). It is noted that, the present disclosure is not limited to the structure as shown in FIG. 11, and it is merely an example for illustrating one of the implements of the present disclosure.

Figure 12:
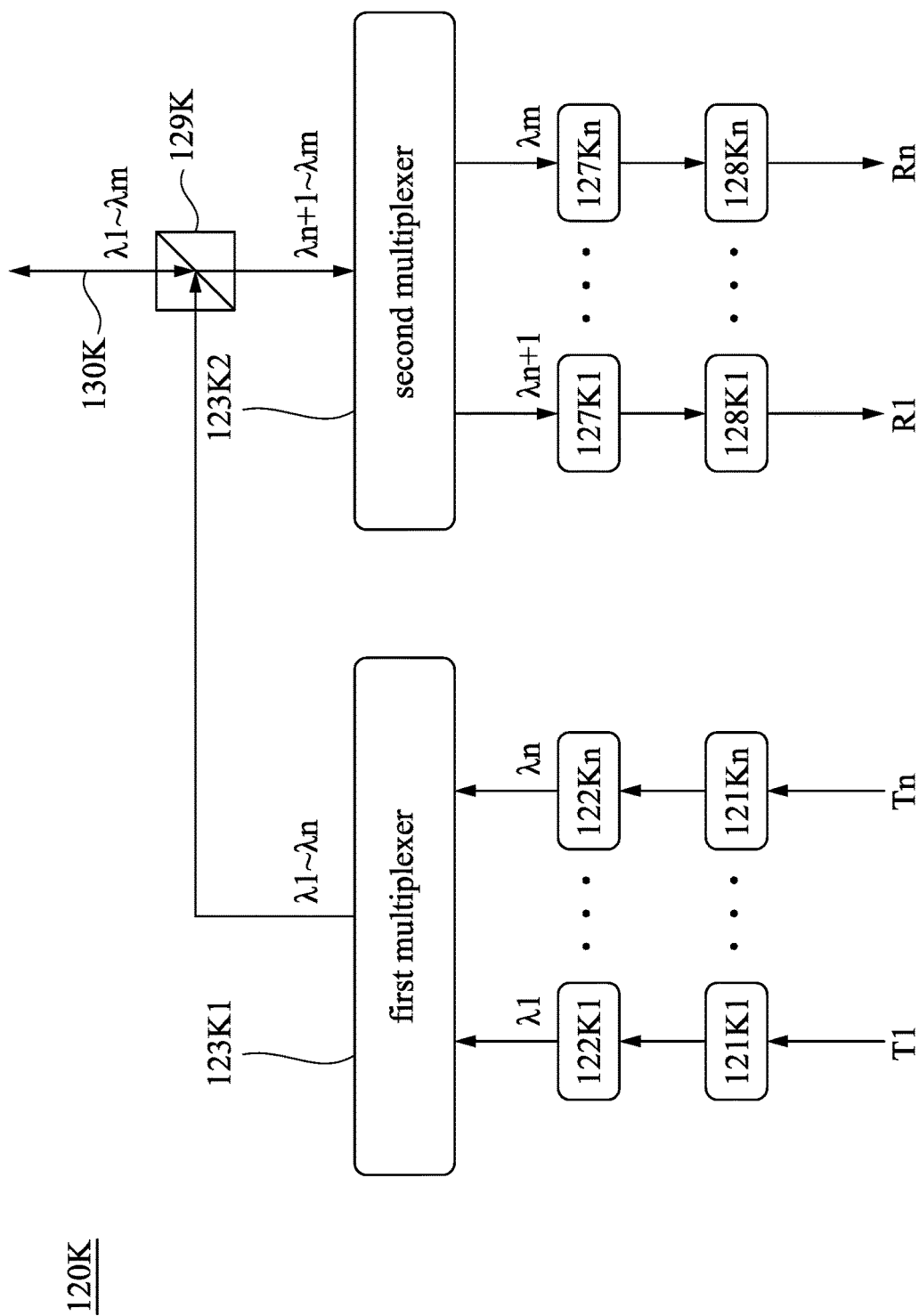
FIG. 12 depicts a schematic diagram of a conversion device of a wireless radio frequency conversion system according to one embodiment of the present disclosure.

FIG. 12 depicts a schematic diagram of conversion devices 120, 140 of the wireless radio frequency conversion system 100 shown in FIG. 1 according to one embodiment of the present disclosure. It is noted that, the conversion device 120K shown in FIG. 12 can be configured to illustrate the first conversion device 120 or the second conversion device 140 in FIG. 1. Reference is now made to both FIG. 1 and FIG. 12, the wireless radio frequency transmit-receive device 100 is configured to receive a plurality of radio frequency signals, and generate a plurality of data signals T1~Tn. The conversion device 120K includes a plurality of drivers 121K1~121Kn, a plurality of photoelectric converters 122K1~122Kn, a first multiplexer 123K1, a second multiplexer 123K2, a plurality of photodetectors 127K1~127Kn, a plurality of amplifiers 128K1~128Kn, and a half-band filter 129K.

With respect to operations, the drivers 121K1~121Kn receive the data signals T1~Tn. The drivers 121K1~121Kn drive the photoelectric converters 122K1~122Kn to generate multiple optical signals λ1~λn with different optical wavelengths according to the data signals T1~Tn. The first multiplexer 123K1 receives multiple optical signals λ1~λn, and combines multiple optical signals λ1~λn to generate a combination optical signal λ1~λn. The half-band filter 129K receives and transmits the combination optical signal λ1~λn generated by the first multiplexer 123K1 to the optical fiber 130K.

At the same time, the half-band filter 129K receives and transmits the combination optical signal λn+1~λm, which is received from the optical fiber 130K, to the second multiplexer 123K2. The second multiplexer 123K2 receives the combination optical signal λn+1~λm, and distributes the combination optical signal λn+1~λm into the multiple optical signals λn+1~λm with different optical wavelengths. Next, the photodetectors 127K1~127Kn detect multiple optical signals λn+1~λm, and generate the data signals R1~Rn according to multiple optical signals λn+1~λm. The amplifiers 128K1~128Kn receive the data signals R1~Rn, and amplify the data signals R1~Rn. In one embodiment, the first multiplexer 123K1 and the second multiplexer 123K2 can be a Wavelength Division Multiplexer (WDM). It is noted that the present disclosure is not limited to the above-mentioned embodiments as shown in FIG. 12.

Figure 13:
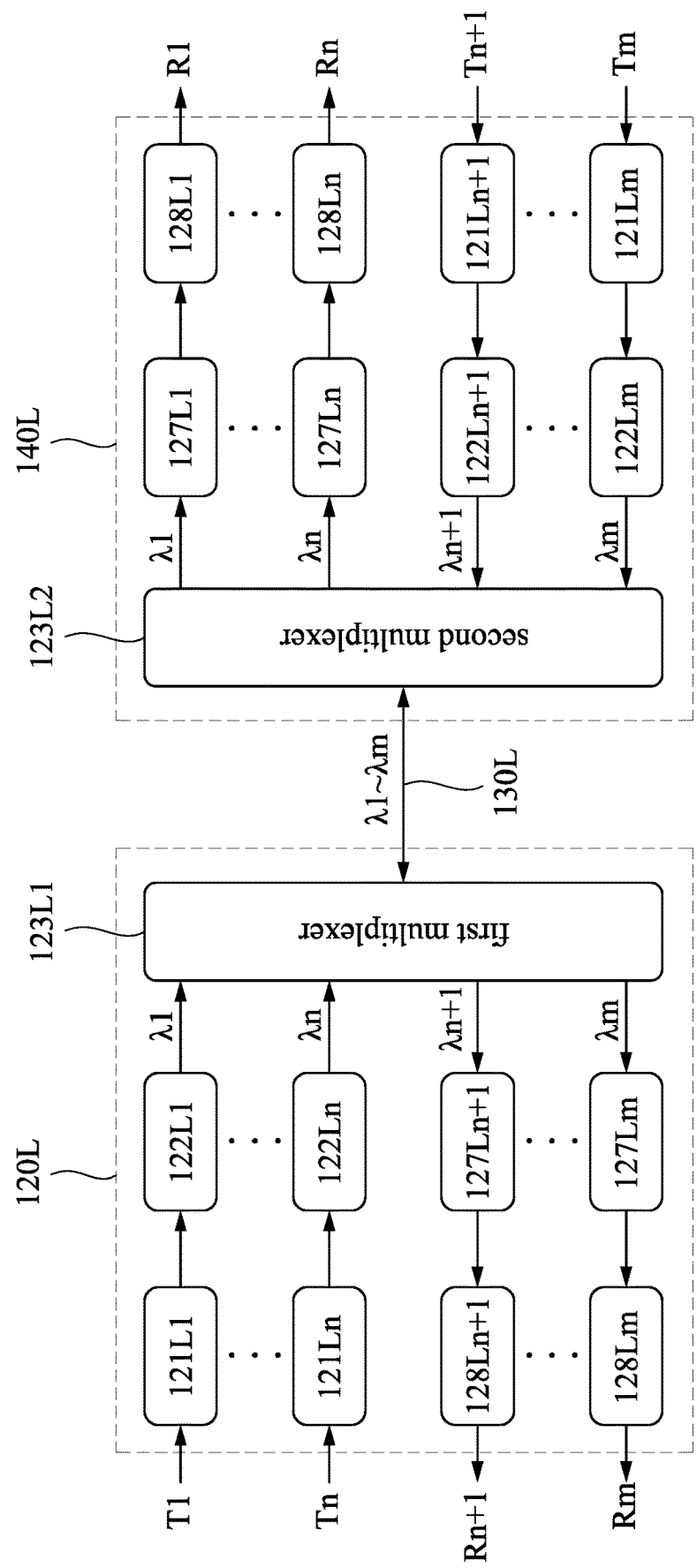
FIG. 13 depicts a schematic diagram of a conversion device of a wireless radio frequency conversion system according to one embodiment of the present disclosure.

FIG. 13 depicts a schematic diagram of conversion devices 120, 140 of the wireless radio frequency conversion system 100 shown in FIG. 1 according to one embodiment of the present disclosure. Reference is now made to both FIG. 1 and FIG. 13, the wireless radio frequency transmit-receive device 110 is configured to receive a plurality of radio frequency signals, and generate a plurality of data signals T1~Tn. The first conversion device 120L includes a plurality of first drivers 121L1~121Ln, a plurality of first photoelectric converters 122L1~122Ln, a plurality of first photodetectors 127Ln+1~127Lm, a plurality of first amplifiers 128Ln+1~128Lm, and a first multiplexer 123L1. Besides, the second conversion device 140L includes a plurality of second drivers 121Ln+1~121Lm, a plurality of second photoelectric converters 122Ln+1~122Lm, a plurality of second photodetectors 127L1~127Ln, a plurality of second amplifiers 128L1~128Ln, and a second multiplexer 123L2.

With respect to operations, the first drivers 121L1~121Ln receive the data signals T1~Tn. The first drivers 121L1~121Ln drive the first photoelectric converters 122L1~122Ln to generate multiple optical signals 2L $\lambda 1 \sim \lambda n$ with different optical wavelengths according to the data signals T1~Tn. The first multiplexer 123L1 receives multiple optical signals $\lambda 1 \sim \lambda n$, and combines multiple optical signals $\lambda 1 \sim \lambda n$ to generate a combination optical signal $\lambda 1 \sim \lambda n$, and transmit to the second multiplexer 123L2 through the optical fiber 130L. The second multiplexer 123L2 distributes the combination optical signal $\lambda 1 \sim \lambda n$ into multiple optical signals $\lambda 1 \sim \lambda n$ with different optical wavelengths. Next, the second photodetectors 127L1~127Ln detect multiple optical signals $\lambda 1 \sim n$, and generate the data signals R1-Rn according to multiple optical signals $\lambda 1 \sim \lambda n$. The second amplifier 128L1~128Ln receives the data signals R1~Rn, and amplify the data signals R1~Rn.

Besides, the second drivers 121Ln+1~121Lm receive the data signal Tn+1~Tm. The second drivers 121Ln+1~121Lm drive the second photoelectric converters 122Ln+1~122Lm to generate multiple optical signals $\lambda n+1 \sim \lambda m$ with different optical wavelengths according to the data signals Tn+1~Tm. The second multiplexer 123L2 is configured to receive multiple optical signals $\lambda n+1 \sim \lambda m$, combine multiple optical signals $\lambda n+1 \sim \lambda m$ to generate the combination optical signal $\lambda n+1 \sim \lambda m$, and transmits to the first multiplexer 123L1 through the optical fibers 130L. The first multiplexer 123L1 distributes the combination optical signal $\lambda n+1 \sim \lambda m$ into multiple optical signals $\lambda n+1 \sim \lambda m$ with different optical wavelengths. Next, the second photodetectors 127Ln+1~127Lm detect multiple optical signals $\lambda n+1 \sim \lambda m$, and generate the data signals Rn+1~Rm according to multiple optical signals $\lambda n+1 \sim \lambda m$. The second amplifiers 128Ln+1~128Lm receive the data signals Rn+1~Rm, and amplify the data signals Rn+1~Rm. In one embodiment, the first multiplexer 123L1 and the second multiplexer 123L2 can be a Wavelength Division Multiplexer (WDM). It is noted that the present disclosure is not limited to the above-mentioned embodiments as shown in FIG. 13.

Figure 14:
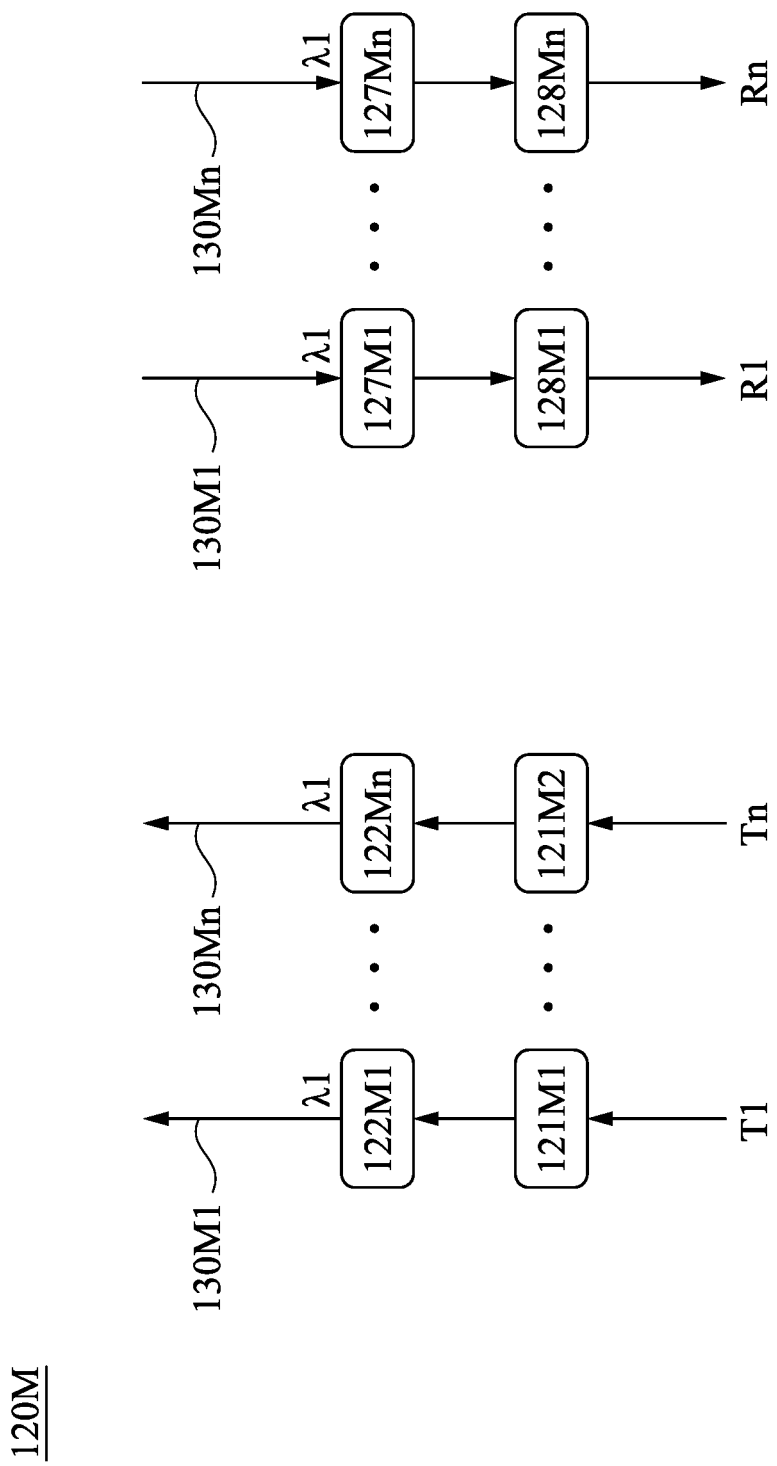
FIG. 14 depicts a schematic diagram of a conversion device of a wireless radio frequency conversion system according to one embodiment of the present disclosure.

FIG. 14 depicts a schematic diagram of conversion devices 120, 140 of the wireless radio frequency conversion system 100 shown in FIG. 1 according to one embodiment of the present disclosure. It is noted that, the conversion device 120M shown in FIG. 14 is configured to illustrate the first conversion device 120 or the second conversion device 140 in FIG. 1. Compared with the conversion device 120J shown in FIG. 11, the conversion device 120M shown in FIG. 14 does not have any multiplexer. After the drivers 121M1~121Mn drive the photoelectric converters 122M1~122Mn to generate multiple optical signals $\lambda 1$ according to the data signals T1~Tn, the multiple optical signals $\lambda 1$ are transmitted through corresponding optical fibers 130M1-130Mn directly. Similarly, the photodetectors 127M1~127Mn receive multiple optical signals $\lambda 1$ through corresponding optical fibers 130M1~130Mn directly, and generate multiple data signals R1~Rn according to multiple optical signals $\lambda 1$. The first amplifiers 128M1~128Mn receive multiple data signals R1~Rn, and amplify multiple data signal R1~Rn. It is noted that the present disclosure is not limited to the above-mentioned embodiments as shown in FIG. 14.

Figure 15:
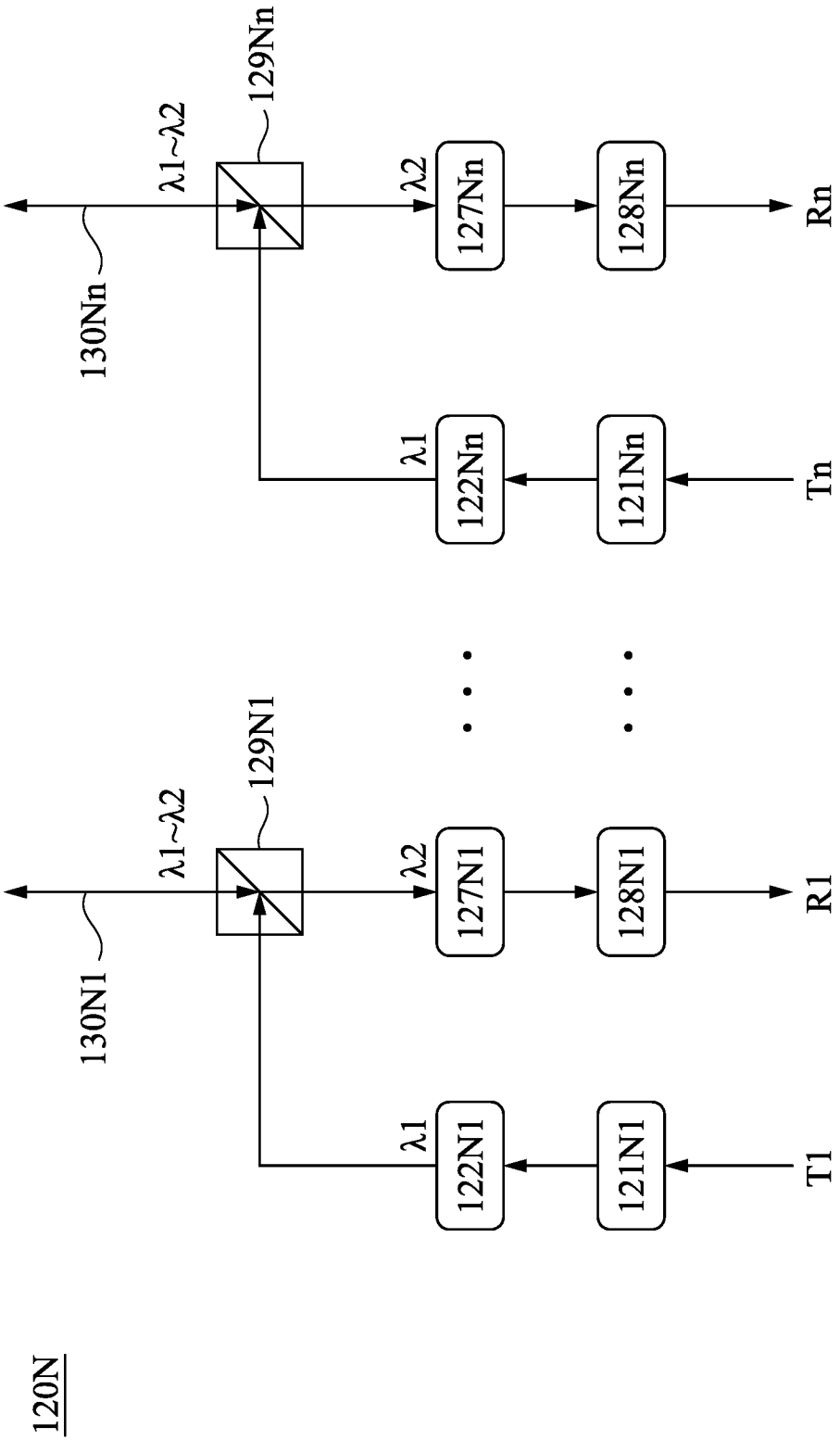
FIG. 15 depicts a schematic diagram of a conversion device of a wireless radio frequency conversion system according to one embodiment of the present disclosure.

FIG. 15 depicts a schematic diagram of conversion devices 120, 140 of the wireless radio frequency conversion system 100 shown in FIG. 1 according to one embodiment of the present disclosure. It is noted that, the conversion device 120N shown in FIG. 15 is configured to illustrate the first conversion device 120 or the second conversion device 140 in FIG. 1. Compared with the conversion device 120K shown in FIG. 12, the conversion device 120N shown in FIG. 15 does not have any multiplexer. After the drivers 121N1~121Nn drive the photoelectric converters 122N1~122Nn to generate multiple optical signals $\lambda 1$ according to the data signals T1~Tn, the half-band filters 129N1~129Nn transmit multiple optical signals $\lambda 1$ through corresponding optical fibers 130N1λ130Nn directly.

Similarly, the half-band filters 129N1λ129Nn receive and transmit the combination optical signal $\lambda 2$ to the photodetectors 127N1~127Nn through corresponding optical fibers 130N1~130Nn directly. Next, the photodetectors 127N1~127Nn detect multiple optical signals $\lambda 2$, and generate the data signals R1~Rn according to multiple optical signals $\lambda 2$. The amplifiers 128N1~128Nn receive the data signals R1~Rn, and amplify the data signals R1~Rn. It is noted that the present disclosure is not limited to the above-mentioned embodiments as shown in FIG. 15.

It can be understood from the embodiments of the present disclosure that application of the present disclosure has the following advantages. The present disclosure provides a wireless radio frequency conversion system. The wireless radio frequency conversion system combines an antenna and a remote radio frequency equipment to be an active antenna unit (AAU), and the wireless radio frequency conversion system uses an optical fiber to transmit a data signal received by the active antenna unit to an indoor wireless radio frequency transmission device, so as to conform the need of 5G network.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A wireless radio frequency conversion system, comprising:
   a wireless radio frequency transmit-receive device, configured to perform a conversion and a transmit-receive manner to at least one radio frequency signal and at least one data signal;
   a first conversion device, coupled to the wireless radio frequency transmit-receive device, and configured to perform a conversion to the at least one data signal and at least one optical signal;
   at least one optical fiber, coupled to the first conversion device, and configured to transmit the at least one optical signal;

a plurality of second conversion devices, coupled to the at least one optical fiber, and configured to perform a conversion to the at least one optical signal and the at least one data signal; and a plurality of wireless radio frequency transmission devices, coupled to the second conversion devices, and configured to perform a conversion and a transmit-receive manner to the at least one data signal and at least one terminal signal;

wherein the second conversion devices are configured to perform a conversion to the at least one optical signal and the at least one data signal, and the wireless radio frequency transmission devices are configured to perform a conversion and transmit-receive manner to the at least one data signal and the at least one terminal signal;

wherein the second conversion devices are located at the same side of the at least one optical fiber;

wherein the wireless radio frequency transmit-receive device and one of the wireless radio frequency transmission devices are located at different sides of the at least one optical fiber.

2. The wireless radio frequency conversion system of claim 1, wherein the at least one data signal or the at least one terminal signal comprises one of at least one radio frequency signal, at least one IQ signal, at least one backhaul transmitting signal, and at least one intermediate frequency signal.

3. The wireless radio frequency conversion system of claim 1, wherein a number of the wireless radio frequency transmit-receive device is plural, and a number of the first conversion device is plural, wherein the wireless radio frequency transmit-receive devices are configured to perform a conversion to the at least one radio frequency signal and the at least one data signal, and the first conversion devices are configured to perform a conversion and a transmit-receive manner to the at least one data signal and the at least one optical signal.

4. The wireless radio frequency conversion system of claim 1, wherein the wireless radio frequency transmit-receive device comprises:
at least one first antenna, configured to transmit and receive the at least one radio frequency signal; and
a first remote radio equipment, configured to perform a conversion to the at least one radio frequency signal and the at least one data signal;
wherein one of the wireless radio frequency transmission devices comprises:
a second remote radio equipment, configured to perform a conversion to the at least one data signal and the at least one terminal signal; and
at least one second antenna, configured to transmit and receive the at least one terminal signal.

5. The wireless radio frequency conversion system of claim 4, further comprising:
a radio frequency transceiver, disposed in the first remote radio equipment or disposed in the second remote radio equipment.

6. The wireless radio frequency conversion system of claim 1, wherein the wireless radio frequency transmit-receive device comprises:
at least one first antenna, configured to transmit and receive the at least one radio frequency signal; and
a radio frequency front end processor, configured to perform a front end signal processing to the at least one radio frequency signal and the at least one data signal;

wherein one of the wireless radio frequency transmission device comprises:
a radio frequency transceiver, configured to perform an analog to digital conversion to the at least one data signal and the at least one terminal signal, and configured to transmit and receive the at least one terminal signal.

7. The wireless radio frequency conversion system of claim 1, wherein the wireless radio frequency transmit-receive device comprises:
at least one first antenna, configured to transmit and receive the at least one radio frequency signal; and
a remote radio equipment, configured to perform a conversion to the at least one radio frequency signal and the at least one data signal;
wherein one of the wireless radio frequency transmission devices comprises:
a processor, configured to perform a signal processing and a transmit-receive manner to the at least one data signal and the at least one terminal signal.

8. The wireless radio frequency conversion system of claim 7, wherein the processor comprises one of a baseband unit, a centralized unit and a distribute unit.

9. The wireless radio frequency conversion system of claim 8, further comprising:
a radio frequency transceiver, disposed in the remote radio equipment or disposed in the processor.

10. The wireless radio frequency conversion system of claim 1, wherein the wireless radio frequency transmit-receive device is configured to perform a conversion and a transmit-receive manner to the at least one radio frequency signal and the at least one data signal, wherein one of the first conversion device and the second conversion devices comprises:
a plurality of drivers, configured to receive the at least one data signal;
a plurality of photoelectric converters, wherein the drivers drive the photoelectric converters to generate the at least one optical signal according to the at least one data signal;
a first multiplexer, configured to receive the at least one optical signal, and combine the at least one optical signal to generate a combination optical signal; and
an optical isolator, configured to let the combination optical signal generated by the first multiplexer pass;
wherein one of the first conversion device and the second conversion devices further comprises:
a second multiplexer, configured to receive the combination optical signal, and distribute the combination optical signal into the at least one optical signal;
a plurality of photodetectors, configured to detect the at least one optical signal, and generate the at least one data signal according to the at least one optical signal; and
a plurality of amplifiers, configured to receive the at least one data signal, and configured to amplify the at least one data signal.

11. The wireless radio frequency conversion system of claim 10, wherein one of the first conversion device and the second conversion devices further comprises:
an optical splitter/combiner, coupled to the optical isolator and the second multiplexer, and configured to transmit the combination optical signal generated by the optical isolator to the at least one optical fiber, wherein the optical splitter/combiner is further configured to receive the combination optical signal, and transmit the combination optical signal to the second multiplexer and the optical isolator, wherein the combination optical signal is blocked by the optical isolator.

12. The wireless radio frequency conversion system of claim 1, wherein the wireless radio frequency transmit-receive device is configured to perform a conversion and a transmit-receive manner to the at least one radio frequency signal and the at least one data signal, wherein one of the first conversion device and the second conversion device comprises:
a first driver, configured to receive a first data signal of the at least one data signal;
a first photoelectric converter, wherein the first driver drives the first photoelectric converter to generate a first optical signal according to the first data signal;
a first optical isolator, configured to let the first optical signal pass;
a first photodetector, configured to detect the first optical signal, and generate the first data signal according to the first optical signal;
a first amplifier, configured to receive the first data signal, and amplify the first data signal; and
a first optical splitter/combiner, coupled to the first optical isolator and the first photodetector, and configured to transmit the first optical signal transmitted by the first optical isolator to the at least one optical fiber, wherein the first optical splitter/combiner is further configured to receive the first optical signal transmitted by the at least one optical fiber, and transmit the first optical signal to the first optical isolator and the first photodetector, wherein the first optical signal is blocked by the first optical isolator;
wherein one of the first conversion device and the second conversion devices further comprises:
a second driver, configured to receive a second data signal of the at least one data signal;
a second photoelectric converter, wherein the second driver drives the second photoelectric converter to generate a second optical signal according to the second data signal;
a second optical isolator, configured to let the second optical signal pass;
a second photodetector, configured to detect the second optical signal, and generate the second data signal according to the second optical signal;
a second amplifier, configured to receive the second data signal, and amplify the second data signal; and
a second optical splitter/combiner, coupled to the second optical isolator and the second photodetector, and configured to transmit the second optical signal transmitted by the second optical isolator to the at least one optical fiber, wherein the second optical splitter/combiner is further configured to receive the second optical signal transmitted by the at least one optical fiber, and transmit the second optical signal to the second optical isolator and the second photodetector, wherein the second optical signal is blocked by the second optical isolator.

13. The wireless radio frequency conversion system of claim 12, wherein one of the first conversion device and the second conversion devices further comprises:
a multiplexer, coupled to the first optical splitter/combiner and the second optical splitter/combiner, wherein the multiplexer is configured to combine the first optical signal and the second optical signal to generate a combination optical signal, and configured to transmit the combination optical signal to the at least one optical fiber, or the multiplexer is configured to receive the combination optical signal transmitted by the at least one optical fiber and configured to distribute the combination optical signal into the first optical signal and the second optical signal.

14. The wireless radio frequency conversion system of claim 12, wherein a number of the at least one optical fiber is plural, and the optical fibers are further configured to transmit a plurality of optical signals, wherein the first optical splitter/combiner is configured to transmit the first optical signal to the optical fibers, and the second optical splitter/combiner is configured to transmit the second optical signal to the optical fibers, and the optical fibers transmit the first optical signal and the second optical signal.

15. The wireless radio frequency conversion system of claim 1, wherein the wireless radio frequency transmit-receive device is configured to perform a conversion and a transmit-receive manner to the at least one radio frequency signal and the at least one data signal, wherein the first conversion device comprises:
a plurality of first drivers, configured to receive the at least one data signal;
a plurality of first photoelectric converters, wherein the first drivers drive the first photoelectric converters to generate the at least one optical signal according to the at least one data signal; and
a first multiplexer, configured to receive the at least one optical signal, and combine the at least one optical signal to generate a first combination optical signal;
wherein one of the second conversion devices comprises:
a second multiplexer, configured to receive the first combination optical signal, and distribute the first combination optical signal into the at least one optical signal;
a plurality of first photodetectors, configured to detect the at least one optical signal, and generate the at least one data signal according to the at least one optical signal; and
a plurality of first amplifiers, configured to receive the at least one data signal, and amplify the at least one data signal.

16. The wireless radio frequency conversion system of claim 15, wherein one of the second conversion devices further comprises:
a plurality of second drivers, configured to receive the at least one data signal;
a plurality of second photoelectric converters, wherein the second drivers drive the second photoelectric converters to generate the at least one optical signal according to the at least one data signal; and
a third multiplexer, configured to receive the at least one optical signal, and combine the at least one optical signal to generate a second combination optical signal;
wherein the first conversion device further comprises:
a fourth multiplexer, configured to receive the second combination optical signal, and distribute the second combination optical signal into the at least one optical signal;
a plurality of second photodetectors, configured to detect the at least one optical signal, and generate the at least one data signal according to the at least one optical signal; and
a plurality of second amplifiers, configured to receive the at least one data signal, and amplify the at least one data signal.

17. The wireless radio frequency conversion system of claim 1, wherein the wireless radio frequency transmit-receive device configured to perform a conversion and a transmit-receive manner to the at least one radio frequency signal and the at least one data signal, wherein one of the first conversion device and the second conversion devices comprises:
- a plurality of drivers, configured to receive the at least one data signal;
- a plurality of photoelectric converters, wherein the drivers drive the photoelectric converters to generate the at least one optical signal according to the at least one data signal;
- a first multiplexer, configured to receive the at least one optical signal, and combine the at least one optical signal to generate a combination optical signal;
- a second multiplexer, configured to receive the combination optical signal, and distribute the combination optical signal into the at least one optical signal;
- a plurality of photodetectors, configured to detect the at least one optical signal, and generate the at least one data signal according to the at least one optical signal; and
- a plurality of amplifiers, configured to receive the at least one data signal, and amplify the at least one data signal.

18. The wireless radio frequency conversion system of claim 17, wherein one of the first conversion device and the second conversion device further comprises:
- a half-band filter, configured to receive and transmit the combination optical signal generated by the first multiplexer to the at least one optical fiber, and configured to receive and transmit the combination optical signal received by the at least one optical fiber to the second multiplexer.

19. The wireless radio frequency conversion system of claim 1, wherein the wireless radio frequency transmit-receive device is configured to perform a conversion and a transmit-receive manner to the at least one radio frequency signal and the at least one data signal, wherein the first conversion device comprises:
- a plurality of first drivers, configured to receive the at least one data signal;
- a plurality of first photoelectric converters, wherein the first drivers drive the first photoelectric converters to generate the at least one optical signal according to the at least one data signal;
- a plurality of first photodetectors, configured to detect the at least one optical signal, and generate the at least one data signal according to the at least one optical signal;
- a plurality of first amplifiers, configured to receive the at least one data signal, and amplify the at least one data signal; and
- a first multiplexer, coupled to the first photoelectric converters and the first photodetectors, wherein the first multiplexer is configured to combine the at least one optical signal to generate a combination optical signal, or distribute the combination optical signal into the at least one optical signal;

wherein one of the second conversion devices comprises:
- a plurality of second drivers, configured to receive the at least one data signal;
- a plurality of second photoelectric converters, wherein the second drivers drive the second photoelectric converters to generate the at least one optical signal according to the at least one data signal;
- a plurality of second photodetectors, configured to detect the at least one optical signal, and generate the at least one data signal according to the at least one optical signal;
- a plurality of second amplifiers, configured to receive the at least one data signal, and amplify the at least one data signal; and
- a second multiplexer, coupled to the second photoelectric converters and the second photodetectors, wherein the second multiplexer is configured to combine the at least one optical signal to generate the combination optical signal, or distribute the combination optical signal into the at least one optical signal.

20. A wireless radio frequency conversion system, comprising:
- a wireless radio frequency transmit-receive device, configured to perform a conversion and a transmit-receive manner to a plurality of radio frequency signals and a plurality of data signals;
- a first conversion device, coupled to the wireless radio frequency transmit-receive device, and configured to perform a conversion to the data signals and a plurality of optical signals, wherein the first conversion device comprises:
  - a transmit-receive terminal multiplexer, configured to combine the optical signals to generate a combination optical signal, or distribute the combination optical signal into the optical signals;
- an optical fiber, coupled to the transmit-receive terminal multiplexer, and configured to transmit the combination optical signal;
- a plurality of second conversion devices, configured to perform a conversion to the optical signals and the data signals, wherein one of the second conversion devices comprises:
  - a transmitting terminal multiplexer, coupled to the optical fiber, and configured to transmit and receive the combination optical signal, wherein the transmitting terminal multiplexer distributes the combination optical signal into the optical signals, or combine the optical signals to generate the combination optical signal; and
- a plurality of wireless radio frequency transmission devices, coupled to the second conversion devices, and configured to perform a conversion and a transmit-receive manner to the data signals and a plurality of terminal signals;

wherein the second conversion devices are configured to perform a conversion to the optical signals and the data signals, and the wireless radio frequency transmission devices are configured to perform a conversion and a transmit-receive manner to the data signals and the terminal signals;

wherein the second conversion devices are located at the same side of the optical fiber;

wherein the wireless radio frequency transmit-receive device and one of the wireless radio frequency transmission devices are located at different sides of the optical fiber.

21. The wireless radio frequency conversion system of claim 20, wherein the data signals or the terminal signals comprise one of at least one radio frequency signal, at least one IQ signal, at least one backhaul transmitting signal, and at least one intermediate frequency signal.

22. The wireless radio frequency conversion system of claim 20, wherein a number of the wireless radio frequency transmit-receive device is plural, and a number of the first conversion device is plural, wherein the wireless radio frequency transmit-receive devices are configured to perform a conversion to the radio frequency signals and the data signals, and the first conversion devices are configured to perform a conversion and a transmit-receive manner to the data signals and the optical signals.

23. The wireless radio frequency conversion system of claim 20, wherein the wireless radio frequency transmit-receive device comprises:
a plurality of first antennas, configured to transmit and receive the radio frequency signals; and
a first remote radio equipment, configured to perform a conversion to the radio frequency signals and the data signals;
wherein one of the wireless radio frequency transmission devices comprises:
a second remote radio equipment, configured to perform a conversion to the data signals and the terminal signals; and
a plurality of second antennas, configured to transmit and receive the terminal signals.

24. The wireless radio frequency conversion system of claim 23, further comprising:
a radio frequency transceiver, disposed in the first remote radio equipment or disposed in the second remote radio equipment.

25. The wireless radio frequency conversion system of claim 20, wherein the wireless radio frequency transmit-receive device comprises:
a plurality of first antennas, configured to transmit and receive the radio frequency signals; and
a radio frequency front end processor, configured to perform a front end signal processing to the radio frequency signals and the data signals;
wherein one of the wireless radio frequency transmission devices comprises:
a radio frequency transceiver, configured to perform an analog to digital conversion to the data signals and the terminal signals, and configured to transmit and receive the terminal signals.

26. The wireless radio frequency conversion system of claim 20, wherein the wireless radio frequency transmit-receive device comprises:
a plurality of first antennas, configured to transmit and receive the radio frequency signals; and
a remote radio equipment, configured to perform a conversion to the radio frequency signals and the data signals;
wherein one of the wireless radio frequency transmission devices comprises:
a processor, configured to perform a signal processing and a transmit-receive manner to the data signals and the terminal signals.

27. The wireless radio frequency conversion system of claim 26, wherein the processor comprises at least one of a baseband unit, a centralized unit, and a distribute unit.

28. The wireless radio frequency conversion system of claim 27, further comprising:
a radio frequency transceiver, disposed in the remote radio equipment or disposed in the processor.

29. The wireless radio frequency conversion system of claim 20, wherein one of the first conversion device and the second conversion devices comprises:
a plurality of drivers, configured to receive the data signals;
a plurality of photoelectric converters, wherein the drivers drive the photoelectric converters to generate the optical signals according to the data signals; and
an optical isolator;
wherein one of the transmit-receive terminal multiplexer of the first conversion device and the transmitting terminal multiplexer of one of the second conversion devices comprises:
a first multiplexer, configured to receive the optical signals, and combine the optical signals to generate the combination optical signal, wherein the optical isolator is configured to let the combination optical signal generated by the first multiplexer pass;
wherein one of the transmit-receive terminal multiplexer of the first conversion device and the transmitting terminal multiplexer of one of the second conversion devices further comprises:
a second multiplexer, configured to receive the combination optical signal, and distribute the combination optical signal into the optical signals;
wherein one of the first conversion device and the second conversion devices comprises:
a plurality of photodetectors, configured to detect the optical signals, and generate the data signals according to the optical signals; and
a plurality of amplifiers, configured to receive the data signals, and configured to amplify the data signals.

30. The wireless radio frequency conversion system of claim 29, wherein one of the first conversion device and the second conversion devices further comprises:
an optical splitter/combiner, coupled to the optical isolator and the second multiplexer, and configured to transmit the combination optical signal generated by the optical isolator to the optical fiber, wherein the optical splitter/combiner is further configured to receive the combination optical signal, and transmit the combination optical signal to the second multiplexer and the optical isolator, wherein the combination optical signal is blocked by the optical isolator.

31. The wireless radio frequency conversion system of claim 20, wherein one of the first conversion device and the second conversion devices comprises:
a first driver, configured to receive a first data signal of the data signals;
a first photoelectric converter, wherein the first driver drives the first photoelectric converter to generate a first optical signal according to the first data signal;
a first optical isolator, configured to let the first optical signal pass;
a first photodetector, configured to detect the first optical signal, and generate the first data signal according to the first optical signal;
a first amplifier, configured to receive the first data signal, and amplify the first data signal; and
a first optical splitter/combiner, coupled to the first optical isolator and the first photodetector, and configured to transmit the first optical signal transmitted by the first optical isolator to the optical fiber, wherein the first optical splitter/combiner is further configured to receive the first optical signal transmitted by the optical fiber, and transmit the first optical signal to the first optical isolator and the first photodetector, wherein the first optical signal is blocked by the first optical isolator;
wherein one of the first conversion device and the second conversion devices further comprises:
a second driver, configured to receive a second data signal of the data signals;

a second photoelectric converter, wherein the second driver drives the second photoelectric converter to generate a second optical signal according to the second data signal;

a second optical isolator, configured to let the second optical signal pass;

a second photodetector, configured to detect the second optical signal, and generate the second data signal according to the second optical signal;

a second amplifier, configured to receive the second data signal, and amplify the second data signal; and a second optical splitter/combiner, coupled to the second optical isolator and the second photodetector, and configured to transmit the second optical signal transmitted by the second optical isolator to the optical fiber, wherein the second optical splitter/combiner is further configured to receive the second optical signal transmitted by the optical fiber, and transmit the second optical signal to the second optical isolator and the second photodetector, wherein the second optical signal is blocked by the second optical isolator.

32. The wireless radio frequency conversion system of claim 31, wherein one of the transmit-receive terminal multiplexer of the first conversion device and the transmitting terminal multiplexer of one of the second conversion devices further comprises:

a multiplexer, coupled to the first optical splitter/combiner and the second optical splitter/combiner, wherein the multiplexer is configured to combine the first optical signal and the second optical signal to generate a combination optical signal and transmit the combination optical signal to the optical fiber, or the multiplexer is configured to receive the combination optical signal transmitted by the optical fiber and distribute the combination optical signal into the first optical signal and the second optical signal.

33. The wireless radio frequency conversion system of claim 31, wherein a number of the optical fiber is plural, and the optical fibers are further configured to transmit a plurality of optical signals, wherein the first optical splitter/combiner is configured to transmit the first optical signal to the optical fibers, and the second optical splitter/combiner is configured to transmit the second optical signal to the optical fibers, and the optical fibers transmit the first optical signal and the second optical signal.

34. The wireless radio frequency conversion system of claim 20, wherein the first conversion device comprises:

a plurality of first drivers, configured to receive the data signals;

a plurality of first photoelectric converters, wherein the first drivers drive the first photoelectric converters to generate the optical signals according to the data signals;

wherein the transmit-receive terminal multiplexer of the first conversion device comprises:

a first multiplexer, configured to receive the optical signals, and combine the optical signals to generate a first combination optical signal;

wherein the transmitting terminal multiplexer of one of the second conversion device comprises:

a second multiplexer, configured to receive the first combination optical signal, and distribute the first combination optical signal into the optical signals;

wherein one of the second conversion device comprises:

a plurality of first photodetectors, configured to detect the optical signals, and generate the data signals according to the optical signals; and a plurality of first amplifiers, configured to receive the data signals, and amplify the data signals.

35. The wireless radio frequency conversion system of claim 34, wherein one of the second conversion devices further comprises:

a plurality of second drivers, configured to receive the data signals; and a plurality of second photoelectric converters, wherein the second drivers drive the second photoelectric converters to generate the optical signals according to the data signals;

wherein the transmitting terminal multiplexer of one of the second conversion devices further comprises:

a third multiplexer, configured to receive the optical signals, and combine the optical signals to generate a second combination optical signal;

wherein the transmit-receive terminal multiplexer of the first conversion device further comprises:

a fourth multiplexer, configured to receive the second combination optical signal, and distribute the second combination optical signal into the optical signals;

wherein the first conversion device further comprises:

a plurality of second photodetectors, configured to detect the optical signals, and generate the data signals according to the optical signals; and a plurality of second amplifiers, configured to receive the data signals, and amplify the data signals.

36. The wireless radio frequency conversion system of claim 20, wherein one of the first conversion device and the second conversion devices comprises:

a plurality of drivers, configured to receive the data signals;

a plurality of photoelectric converters, wherein the drivers drive the photoelectric converters to generate the optical signals according to the data signals;

wherein one of the transmit-receive terminal multiplexer of the first conversion device and the transmitting terminal multiplexer of one of the second conversion devices comprises:

a first multiplexer, configured to receive the optical signals, and combine the optical signals to generate a combination optical signal;

wherein one of the transmit-receive terminal multiplexer of the first conversion device and the transmitting terminal multiplexer of one of the second conversion devices further comprises:

a second multiplexer, configured to receive the combination optical signal, and distribute the combination optical signal into the optical signals;

wherein one of the first conversion device and the second conversion devices comprises:

a plurality of photodetectors, configured to detect the optical signals, and generate the data signals according to the optical signals; and a plurality of amplifiers, configured to receive the data signals, and amplify the data signals.

37. The wireless radio frequency conversion system of claim 36, wherein one of the first conversion device and the second conversion devices further comprises:

a half-band filter, configured to receive and transmit the combination optical signal generated by the first multiplexer to the optical fiber, and configured to receive and transmit the combination optical signal received by the optical fiber to the second multiplexer.

* * * * *